(12) United States Patent
Holmes et al.

(10) Patent No.: US 7,952,783 B2
(45) Date of Patent: May 31, 2011

(54) SCANNING MIRROR CONTROL

(75) Inventors: Steve Holmes, Sammamish, WA (US); Clint Charles Rollins, Poulsbo, WA (US); Margaret K. Brown, Seattle, WA (US); Michael L. Schaaf, Bainbridge Island, WA (US); Bruce C. Rothaar, Woodinville, WA (US); Robert J. Jackson, Monroe, WA (US); Lifford McLauchlan, Corpus Christi, TX (US); Mehrube Mehrubeoglu, Corpus Christi, TX (US); Gregory Schneider, Occidental, CA (US)

(73) Assignee: Microvision, Inc., Redmond, WA (US)

( * ) Notice: Subject to any disclaimer, the term of this patent is extended or adjusted under 35 U.S.C. 154(b) by 512 days.

(21) Appl. No.: 12/235,500

(22) Filed: Sep. 22, 2008

(65) Prior Publication Data
US 2010/0073748 A1 Mar. 25, 2010

(51) Int. Cl.
G02B 26/08 (2006.01)
(52) U.S. Cl. .................................... 359/224.1
(58) Field of Classification Search ............... 359/197.1, 359/198.1, 223.1–226.1
See application file for complete search history.

(56) References Cited

U.S. PATENT DOCUMENTS
6,697,096 B2 * 2/2004 Agorio ......................... 347/243
2005/0077860 A1 4/2005 Hagen

FOREIGN PATENT DOCUMENTS
WO WO2005078509 8/2005

OTHER PUBLICATIONS

Fujino, et al., "Cascaded Micromirror Pair Driven by Angular Vertical Combs for Two-Axis Scanning", *IEEE/LEOS International Conference on Optical MEMS, Tub7* 2003, 99-100.
Microvision, , "PCT Search Report and Written Opinion", *PCT/US2009/054654 Search Report and Written Opinion for corresponding US case* Mar. 31, 2010, All.
Yalcinkaya, et al., "Two-Axis Electromagnetic Microscanner for High Resolution Displays", *Journal Microelectromechanical Systems*, vol. 15, No. 4 2006, 789-794.
Schneider, Gregory , "Taming Resonance in Servos", *Machine Design* Feb. 7, 1985, 73-76.
Sprague, Randall et al., "Bi-Axial Magnetic Drive for Scanned Beam Display Mirrors", *SPIE* vol. 5721 Feb. 28, 2005, 1-14.

* cited by examiner

*Primary Examiner* — Euncha P Cherry
(74) *Attorney, Agent, or Firm* — Kevin D. Wills

(57) ABSTRACT

A scanning beam projection system includes a scanning mirror having a fast-scan axis and a slow-scan axis. Movement on the slow-scan axis is controlled by a slow-scan scanning mirror control system. The control system receives position information describing angular displacement of the mirror. An outer loop of the control system operates in the frequency domain and determines harmonic drive coefficients for a scanning mirror drive signal. An inner loop of the control system operates in the time domain and compensates for a scanning mirror resonant vibration mode at a frequency within the frequency band occupied by the harmonic drive coefficients.

25 Claims, 18 Drawing Sheets

SCANNING MIRROR CONTROL

FIELD

The present invention relates generally to scanning beam display systems, and more specifically to controlling the deflection of scanning mirrors in scanning beam display systems.

BACKGROUND

Scanned light beams are used to produce display images for a wide variety of applications, including such applications as mobile microprojectors, automotive head-up displays, and head-worn displays. The displays are created by using the angular motion of a mirror to deflect a modulated light beam to cover the desired field of view. By moving the mirror about two orthogonal axes, a rectangular field of view can be created, providing the familiar look of a raster display in a compact and portable package.

Controlling the mirror deflection to correctly produce the desired angular motion presents a significant engineering challenge. This is due, in part, to the fact that mirrors are mechanical devices that exhibit vibration modes at various resonant frequencies.

DESCRIPTION OF EMBODIMENTS

Figure 1:
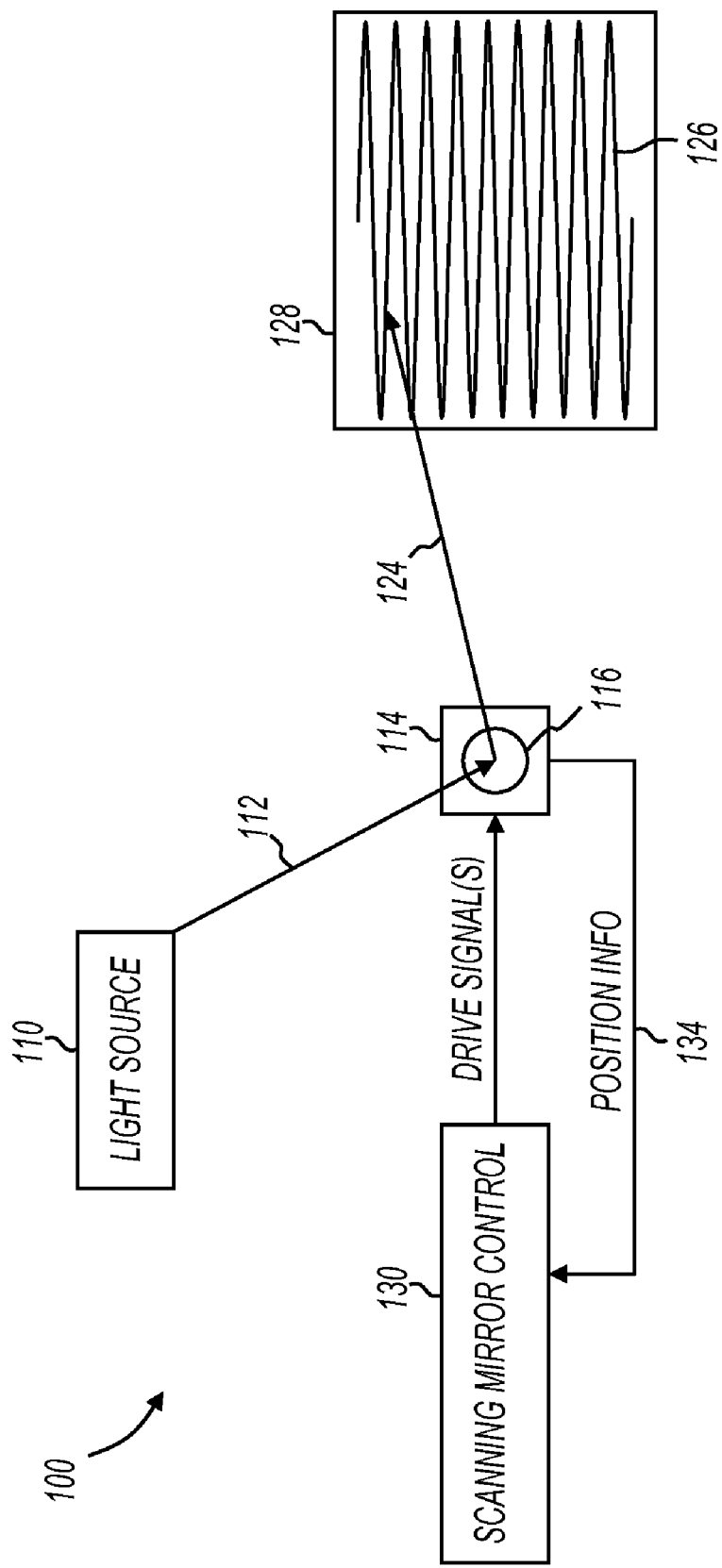
FIG. 1 shows a scanned beam projection system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanned beam projection system in accordance with various embodiments of the present invention. As shown in FIG. 1, scanned beam projection system 100 includes a light source 110, which may be a laser light source such as a laser diode or the like, capable of emitting a beam 112 which may be a laser beam. The beam 112 impinges on a scanning platform 114 which includes a microelectromechanical system (MEMS) based scanner or the like, and reflects off of scanning mirror 116 to generate a controlled output beam 124. A scanning mirror control circuit 130 provides one or more drive signal(s) to control the angular motion of scanning mirror 116 to cause output beam 124 to generate a raster scan 126 on a projection surface 128.

In some embodiments, raster scan 126 is formed by combining a sinusoidal component on the fast-scan axis (horizontal axis) and a sawtooth component on the slow-scan axis (vertical axis). In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the fast-scan sinusoidal pattern as the beam sweeps vertically top-to-bottom, but does not show the flyback from bottom-to-top.

Scanning mirror 116 is deflected according to signals provided by scanning mirror control circuit 130, and mirror position information is provided back to scanning mirror control circuit 130 at 134. The mirror position information may describe angular position in the vertical slow-scan direction, the horizontal fast-scan direction, or both. Scanning mirror control circuit 130 receives the position information, determines the appropriate drive signals, and drives scanning mirror 116.

Figure 2:
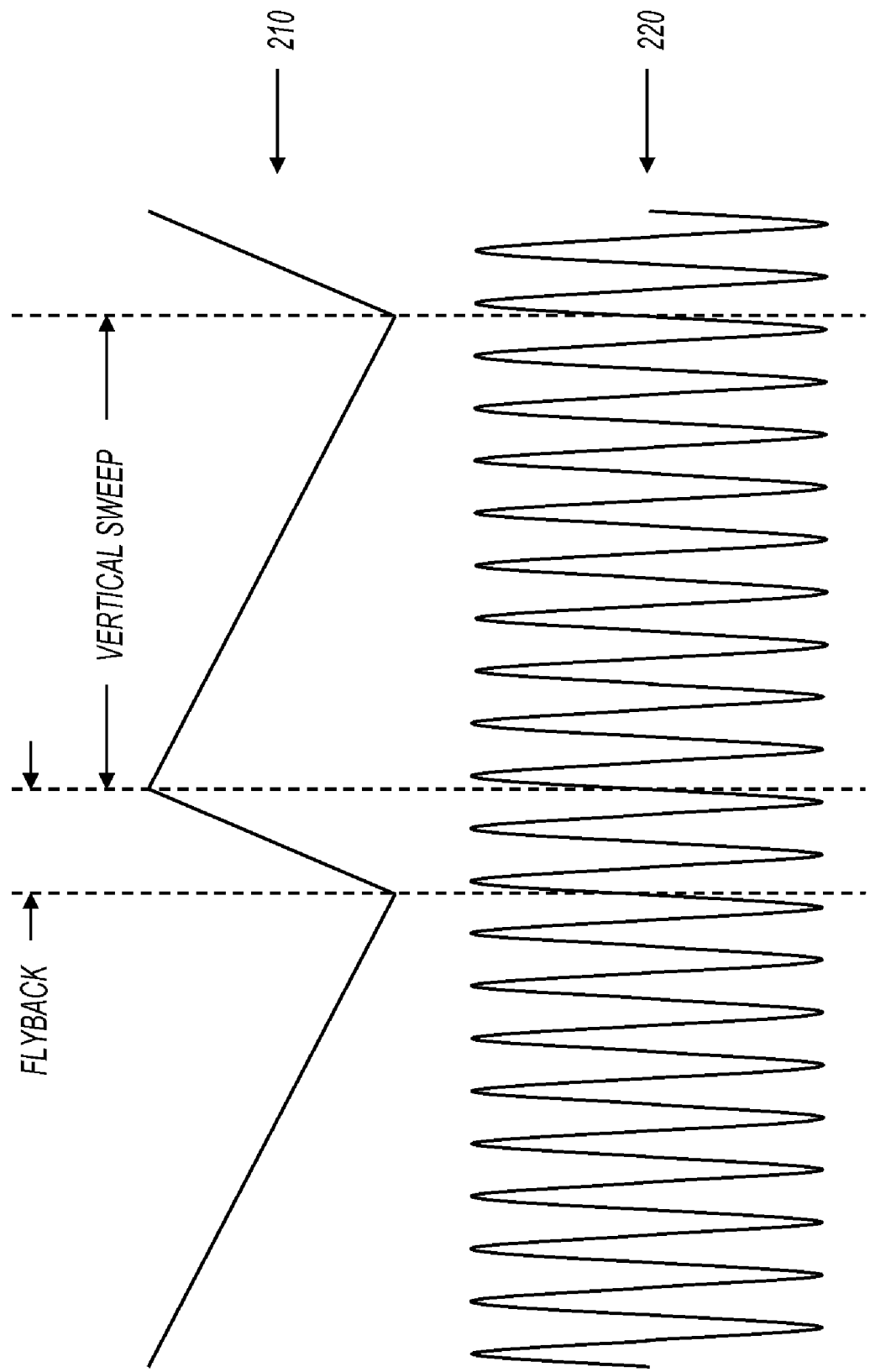
FIG. 2 shows beam deflection waveforms that result in the scan trajectory of FIG. 1.

FIG. 2 shows beam deflection waveforms that result in the raster scan trajectory of FIG. 1. Vertical deflection waveform 210 is a sawtooth waveform, and horizontal deflection waveform 220 is a sinusoidal waveform. The sawtooth vertical deflection waveform 210 includes a falling portion corresponding to the sweep of raster scan 126 from top-to-bottom, and also includes a rising portion corresponding to the flyback from bottom-to-top. After the flyback, the vertical sweep traverses substantially the same path on each trajectory.

It is important to note that the waveforms of FIG. 2 represent the desired mirror deflection as opposed to the drive signals provided to the scanning mirror. If the scanning mirror had a perfectly flat natural response with no resonance, scanning mirror control circuit 130 could drive signals 210 and 220 as shown. In actual implementations, scanning mirror 116 has resonant characteristics with is multiple distinct vibration modes. Scanning mirror control circuit 130 modifies the drive signals in an attempt to cause the scanning mirror 116 to deflect according to the waveforms shown in FIG. 2 and thereby sweep controlled beam 124 to generate raster scan 126.

For ease of illustration, FIGS. 1 and 2 show a relatively small number of fast-scan cycles for each slow-scan cycle. In some embodiments, a significantly larger number of fast-scan cycles exist for each slow-scan cycle. For example, the slow-scan sweep may operate near 60 Hz and the fast-scan sweep may operate upwards of 18 kHz. One skilled in the art will appreciate that the various embodiments of the present invention may be advantageously applied to any scanning system regardless of the relationship between slow and fast-scan frequencies.

Although FIGS. 1 and 2 show a sawtooth waveform for the slow-scan deflection, the various embodiments of the invention are not so limited. For example, the slow-scan deflection waveform may be triangular, limited harmonic sinusoidal, or any other shape, without departing from the scope of the present invention.

Figure 3:
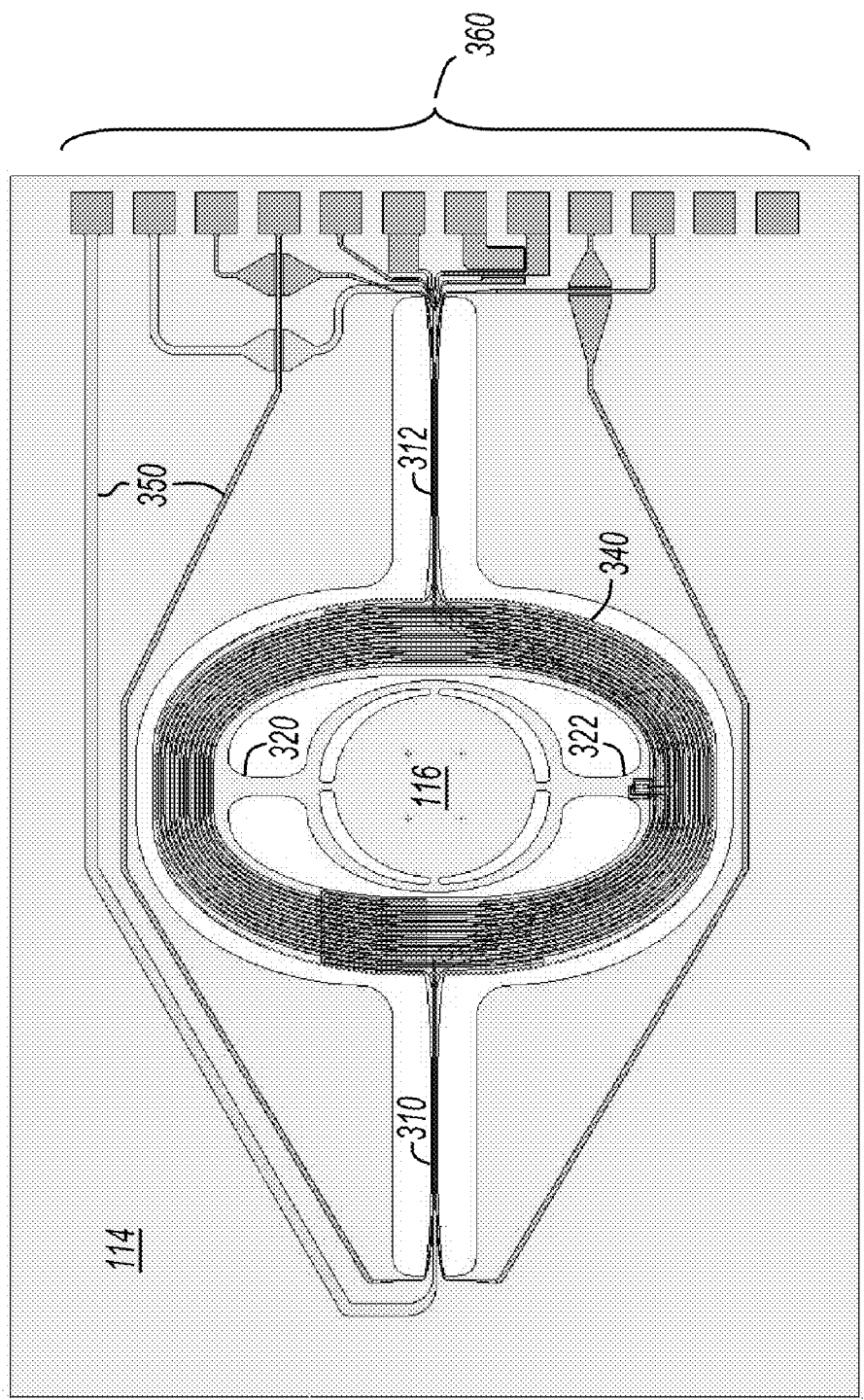
FIG. 3 shows a plan view of a scanning platform with a microelectromechanical system (MEMS) scanning mirror.

FIG. 3 shows a plan view of a scanning platform with a microelectromechanical system (MEMS) scanning mirror. Scanning platform 114 includes gimbal 340 and scanning mirror 116. Gimbal 340 is coupled to scanning platform 114 by flexures 310 and 312, and scanning mirror 116 is coupled to gimbal 340 by flexures 320 and 322. Gimbal 340 has a drive coil connected to drive lines 350. Current driven into drive lines 350 produces a current in the drive coil. Scanning platform 114 also incorporates one or more integrated piezoresistive position sensors. In some embodiments, scanning platform 114 includes one position sensor for each axis. Two of the interconnects 360 are coupled to drive lines 350. The remaining interconnects provide for the integrated position sensors for each axis.

In operation, an external magnetic field source (not shown) imposes a magnetic field on the drive coil. The magnetic field imposed on the drive coil by the external magnetic field source has a component in the plane of the coil, and is oriented at roughly 45° with respect to the two drive axes. The in-plane current in the coil windings interacts with the in-plane magnetic field to produce out-of-plane Lorentz forces on the conductors. Since the drive current forms a loop on gimbal 340, the current reverses sign across the scan axes. This means the Lorentz forces also reverse sign across the scan axes, resulting in a torque in the plane of and normal to the magnetic field. This combined torque produces responses in the two scan directions depending on the frequency content of the torque.

The frequency components of the applied torque are selected to excite the horizontal mirror resonance (~18 kHz) and to provide a ramp drive for the vertical mirror motion (60 Hz, 120 Hz, 180 Hz . . . ). The frequency response characteristics of mirror 116 and gimbal 340 act to separate the torque components into their respective motions.

Figure 4:
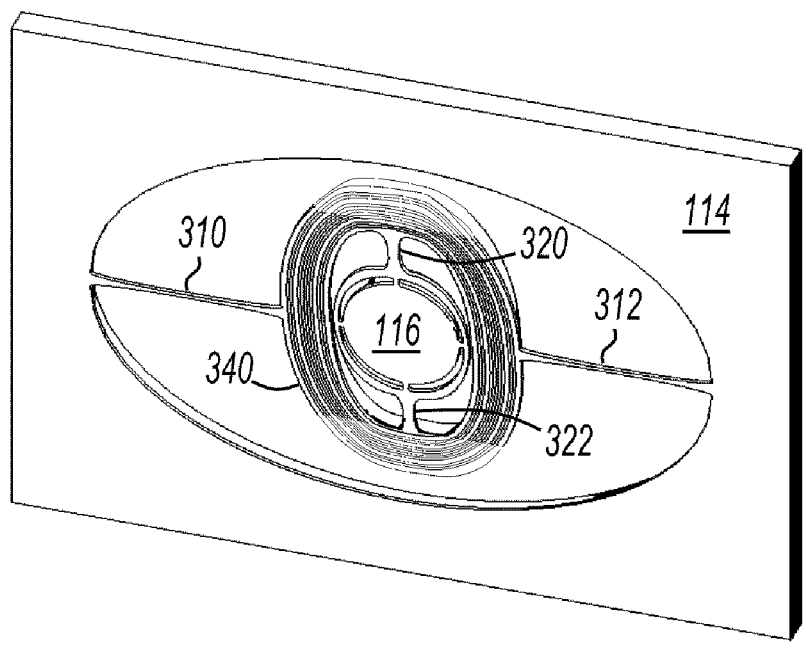
FIGS. 4 and 5 show two vibration modes of the MEMS scanning mirror of FIG. 3.
Figure 5:
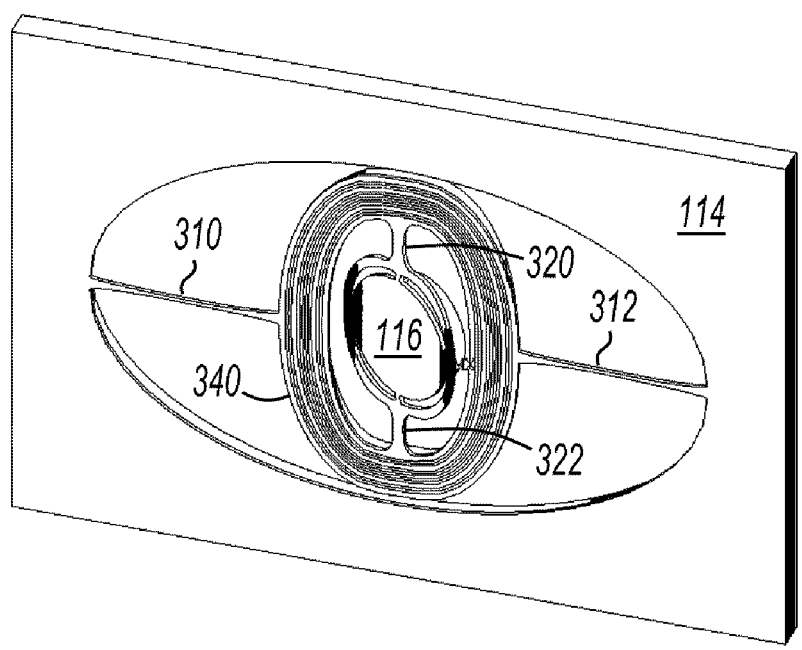

Two resonant vibration modes of the scanner are shown in FIGS. 4 and 5. The first mode, shown in FIG. 4, is a vertical resonant mode of the entire gimbaled structure, and the second mode, shown in FIG. 5, is a horizontal resonant mode of scanning mirror 116. In the vertical resonant mode shown in FIG. 4, gimbal 340 rotates on flexures 310 and 312; and in the horizontal resonant mode shown in FIG. 5, mirror 116 rotates on flexures 320 and 322. Many other vibration modes may exist, but these two show the desirable angular movement on the two axes.

The frequencies of the various resonant modes may vary based on selected design criteria. For example, the frequency of the resonant mode shown in FIG. 5 may be increased or decreased by modifying the inertial mass of scanning mirror 116, or by varying properties of flexures 310 and 312. Likewise, the frequency of the resonant mode shown in FIG. 4 may be increased or decreased by modifying the properties of flexures 320 and 322, or by modifying the inertial mass of gimbal 340 and scanning mirror 116. An example MEMS mirror with different resonant characteristics is described in Randall B. Sprague et al., *Bi-axial Magnetic Drive for Scanned Beam Display Mirrors*, Proc. SPIE, Vol. 5721, 1 (Jan. 24, 2005); DOI:10.117/12.596942 Online Publication Date: 28 Feb. 2005. One skilled in art will appreciate that any scanning mirror with any resonant properties may be utilized with the various embodiments of the present invention.

The scanning mirror shown in FIGS. 3-5 are an example of a "coil driven mirror", and more specifically, a "moving coil" design, because the coil moves in the presence of a magnetic field. In other embodiments, the mirror has one or more fixed magnets attached thereto, and the coil is stationary. In still further embodiments, other types of drive mechanisms are utilized (e.g., capacitively driven MEMS mirrors). The type of drive mechanism used to cause mirror motion is not a limitation of the present invention.

Figure 6:
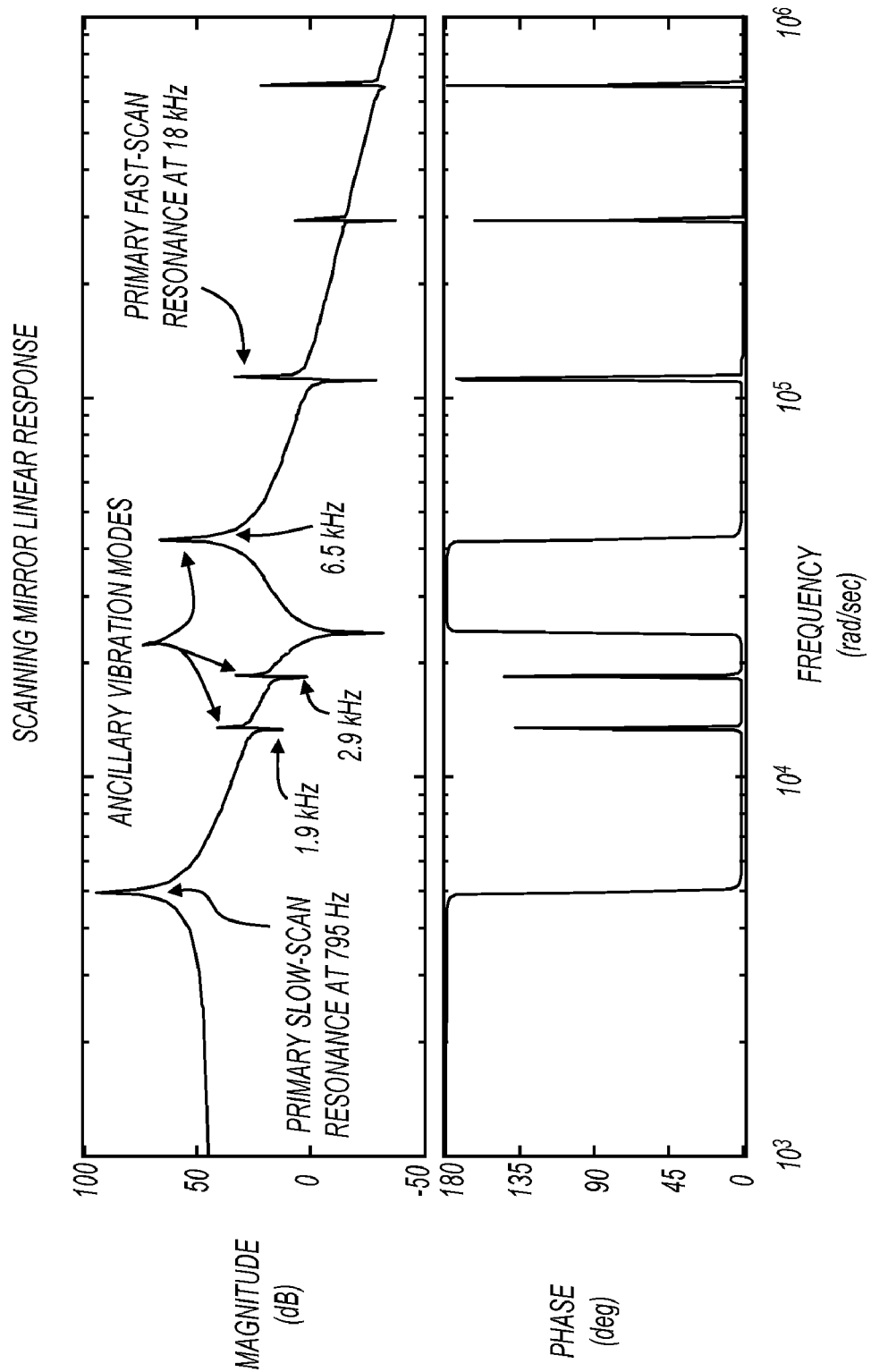
FIG. 6 shows a linear response of the MEMS scanning mirror of FIG. 3.

FIG. 6 shows a linear response of the MEMS scanning mirror of FIG. 3. The scanning mirror exhibits a primary slow-scan resonance at 795 Hz and a primary fast-scan resonance at 18 kHz. The primary slow-scan resonance at 795 Hz causes the gimbal 340 to oscillate in the slow-scan (vertical) direction as shown in FIG. 4. The primary fast-scan resonance at 18 kHz causes the scanning mirror to oscillate in the fast-scan (horizontal) direction as shown in FIG. 5. The ancillary vibration modes at 1.9 kHz, 2.9 kHz, and 6.5 kHz produce combinations of horizontal/vertical movements that are generally undesirable.

The various resonant vibration modes pose challenges to the scanning mirror control circuit 130. For example, in order to produce the ramp waveform 210 (FIG. 2), the scanning mirror control circuit may drive harmonics of 60 Hz (60 Hz, 120 Hz, 180 Hz, . . . ) out past the resonance at 795 Hz. The mechanical gain exhibited by the mirror at 795 Hz causes vibration at some harmonics to be accentuated, thereby distorting the ramp.

Various embodiments of the present invention provide a feedback loop that modifies the scanning mirror drive signals to produce the desired scanning mirror behavior in the presence of high mechanical gain and non-linear characteristics that produce additional motion distortion. In some embodiments, the amplitude and phase of each of the harmonic drive signals is modified in response to the measured behavior of the mirror. Further, each harmonic signal may be modified at a different rate (the "learning rate"). In general, harmonic signals in regions of high mechanical gain are modified more slowly (have lower learning rates) than harmonic signals in regions of low mechanical gain. In some embodiments, learning rates are adaptive.

Figure 7:
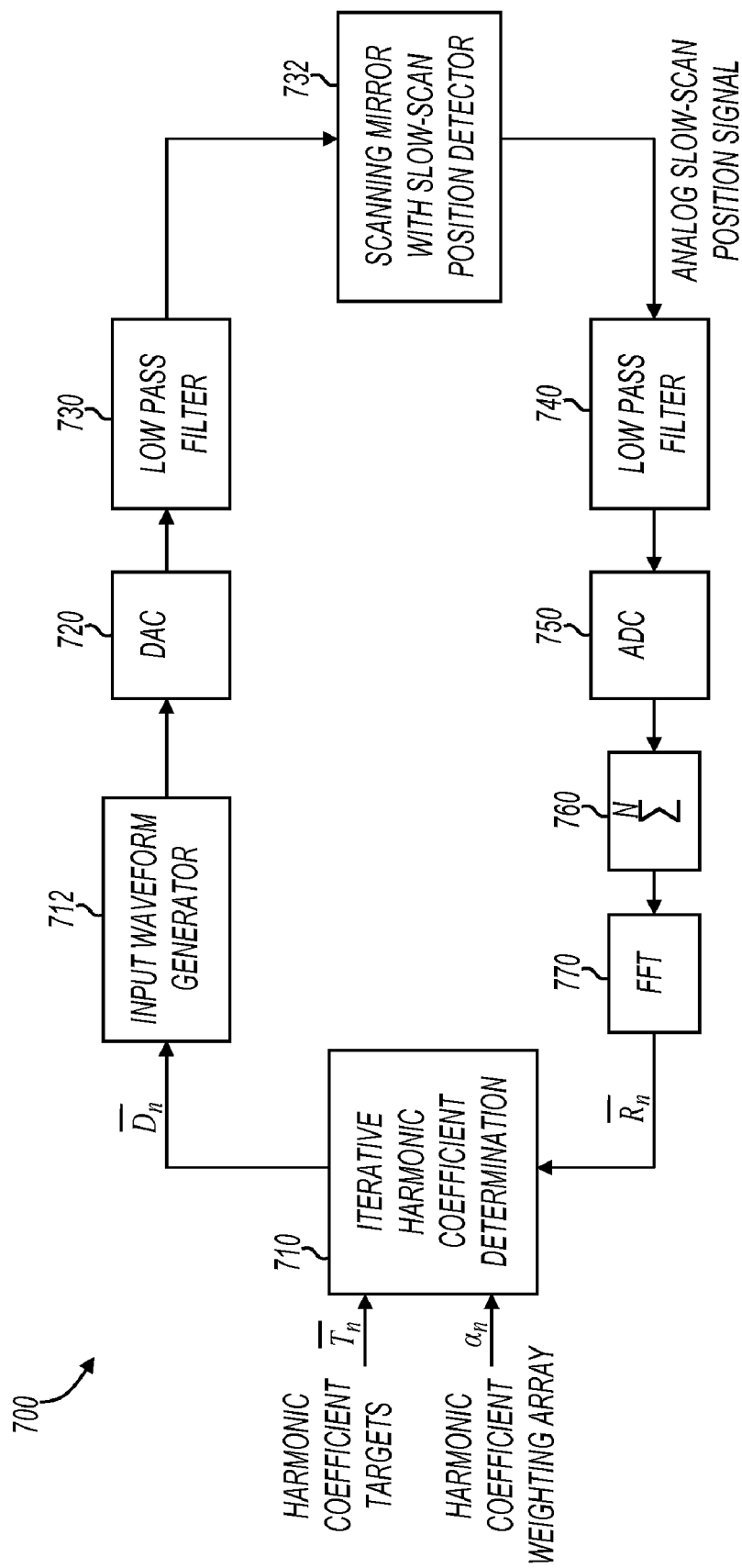
FIG. 7 shows a scanning mirror slow-scan control loop that iteratively determines harmonic coefficients using a harmonic coefficient weighting array.

FIG. 7 shows a scanning mirror slow-scan control loop that iteratively determines harmonic coefficients using a harmonic coefficient weighting array. Slow-scan control loop 700 includes iterative harmonic coefficient determination block 710, input waveform generator 712, digital-to-analog converter (DAC) 720, low pass filters 730 and 740, scanning mirror 732, analog-to-digital converter (ADC) 750, summing buffer 760, and fast Fourier transform (FFT) block 770. Scanning mirror 732 may be any scanning mirror, including the examples described above with reference to FIG. 3.

In operation, harmonic drive coefficients are provided to input waveform generator 712. The harmonic drive coefficients are represented as $$\overline{D}_n = D_R + iD_I, \quad (1)$$

where n is the harmonic number, $\overline{D}_n$ is complex, $D_R$ is real, and $iD_I$ is imaginary. Input waveform generator 712 performs an inverse fast Fourier transform (IFFT) or the equivalent, producing a time domain digital waveform from the harmonic drive coefficients, and the time domain digital waveform is converted to an analog signal by DAC 720 and low pass filtered at 730. The resulting analog slow-scan drive signal drives scanning mirror 732.

Scanning mirror 732 includes position detectors in the slow-scan direction. These sensors provide a signal that corresponds to the actual angular displacement of the mirror in the slow-scan direction. The analog slow-scan position signal is provided from the sensors to low pass filter 740. Low pass filter 740 may have any suitable cut-off frequency. For example, when scanning mirror 732 has a response similar to that shown in FIG. 6, the filter cut-off frequency may be on the order of a few kHz to remove any signal energy resulting from the higher frequency vibration modes of the mirror.

The low pass filtered slow-scan position signal is converted to digital form by ADC 750, and summing buffer 760 sums (or averages) the slow-scan position waveform over N cycles to increase the signal-to-noise ration (SNR). The slow-scan position waveform can be averaged over any number of cycles without departing from the scope of the present invention. The averaged slow-scan position waveform is processed by FFT 770 to yield the return harmonic coefficients represented as $$\overline{R}_n = R_R + iR_I, \quad (2)$$

where n is the harmonic number, $\overline{R}_n$ is complex, $R_R$ is the real, and $iR_I$ is imaginary. Iterative harmonic coefficient determination block 710 receives the return harmonic coefficients $\overline{R}_n$ as well as harmonic coefficient targets and a harmonic coefficient weighting array $\alpha_n$. The harmonic coefficient targets are represented as $$\overline{T}_n = T_R + iT_I, \quad (3)$$

where n is the harmonic number, $\overline{T}_n$ is complex, $T_R$ is the real, and $iT_I$ is imaginary. Iterative harmonic coefficient determination block 710 determines the error in the return coefficients as $$\overline{E}_n = \overline{T}_n - \overline{R}_n, \quad (4)$$

and then updates the harmonic drive coefficients as $$\overline{D}_n^{k+1} = \overline{D}_n^k + \beta \alpha_n \overline{E}_n^k, \quad (5)$$

where the superscript k in equation (5) refers the $k^{th}$ iteration, the k+1 superscript refers to the next iteration, β is a global gain value (learning rate) in the range of 0 to 1. Alpha, $\alpha_n$, is the static weighting array that provides appropriate magnitude and phase scaling (vector direction) for successive reduction of the error quantity $E_n$.

In some embodiments, the weighting array is the inverse of the mirror gain (transfer function) normalized to one at the primary frequency (60 Hz). One or more mirrors can be characterized, and the weighting array is determined from the measured transfer function. Alternatively, the linear transfer function of the mirror can be measured and learned at device startup or during operation of the device. For example, assume that a measured mirror gain (see FIG. 6) at 60 Hz intervals for 17 harmonics is as follows:

MirrorGain=[0.0562, 0.0595, 0.0630, 0.0653, 0.0668, 0.0724 0.0812, 0.0912, 0.1122, 0.1496, 0.2511, 1.0, 1.0, 0.2511 0.1412, 0.0944, 0.0668]

where the first entry of MirrorGain corresponds to the gain at 60 Hz and the last entry of Mirror Gain corresponds to the gain at 1.02 kHz. These are shown as real coefficients (magnitude only), but they can be complex values (magnitude and phase). The weighting array $\alpha_n$ (Alpha(n)) can be determined using the following algorithm:

$$Alpha'(n) = \frac{MirrorGain(n)}{MirrorGain(1)} \text{ // Normalize to the first harmonic}$$

$$\alpha_n = \frac{1}{Alpha'(n)} \text{ // Inverse of the linear gain at each discrete harmonic (frequency)}$$

It should be noted that the Alpha weighting does not necessarily have to conform to the MEMS gain properties. The MEMS transfer function can be modified by a closed loop feedback system and the composite gain of the combined system can be used to compute $\alpha_n$ (Alpha(n)).

The harmonic drive coefficient update shown in equation (5) and the operation of input waveform generator 712 can be performed in accordance with the following pseudocode, where Return(n) is $\overline{R}_n^k$, Dold(n) is $\overline{D}_n^k$, Dnew(n) is $\overline{D}_n^{k+1}$, Targ(n) is $T_n$, and Timepts is an integer corresponding to the number of points in the ramp waveform:

```
Loop until ramp is smooth (linear)    // Main Loop
    for n=1:num_tune_harmonics        // 17 harmonics in this example
        Dnew(n)=Dold(n)+(Beta*Alpha(n)*(Targ(n)-Return(n)));
                                      // Primary iterative equation (5)
    end for
    DnewAmp=abs(Dnew);                // absolute value of each drive coefficient
    Dnewphz=atan(imag(Dnew),real(Dnew));
    // phase of each drive coefficient
    For tt=1:(timepts); // Construct time domain ramp from new coefficients
        time(tt)=tt/(timepts;         //normalized to one period
        Votemp=0;
        for n=1:num_tune_harmonics    //sum of harmonics in time domain
            Votemp=Votemp+(DnewAmp(n)*sin((n*w*time(tt))+
            Dnewphz(n)));
        end for
        Vo(tt)=Votemp;
    end for
    Voltdrive=Vo;                     //array of time domain Ramp Drive
    Dold=Dnew
end loop                              // Main Loop
```

Figure 8:
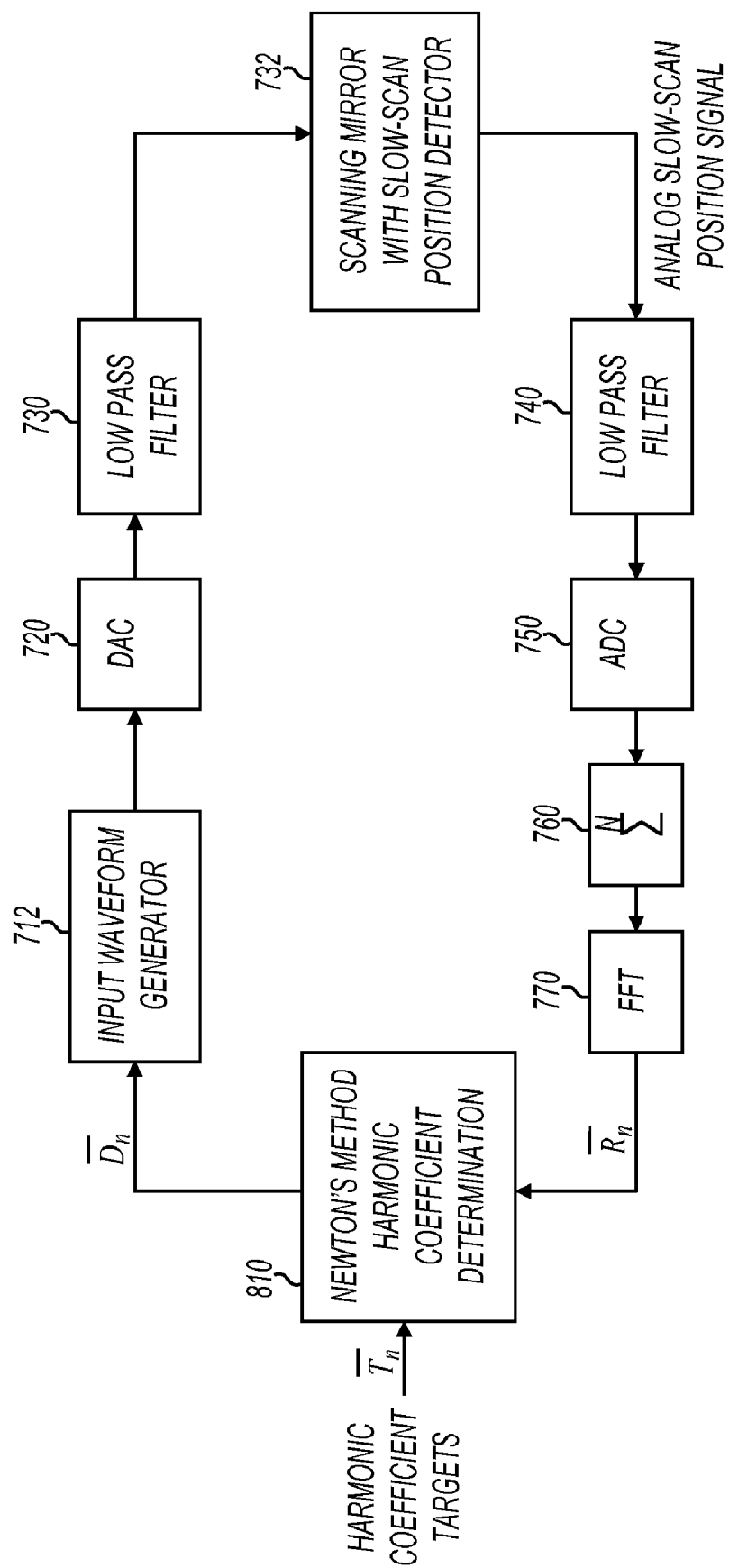
FIG. 8 shows a scanning mirror slow-scan control loop that iteratively determines harmonic coefficients using an approximation of Newton's method.

FIG. 8 shows a scanning mirror slow-scan control loop that iteratively determines harmonic coefficients using an approximation of Newton's method. Slow-scan control loop 800 includes input waveform generator 712, digital-to-analog converter (DAC) 720, low pass filters 730 and 740, scanning mirror 732, analog-to-digital converter (ADC) 750, summing buffer 760, and fast Fourier transform (FFT) block 770, all of which are described above with respect to FIG. 7.

Slow-scan control loop 800 also includes Newton's method harmonic coefficient determination block 810. Similar to block 710 in FIG. 7, block 810 receives the return harmonic coefficients $\overline{R}_n$ and targets $T_n$, and produces harmonic drive coefficients $\overline{D}_n$. The Newton's method block 810 differs from block 710, in that block 810 does not receive a weighting array. Instead, block 810 adaptively modifies the learning rate of each harmonic coefficient as explained below.

In numerical analysis, Newton's method is useful for finding successively better approximations to the zeros (or roots)

of a real-valued function. As applied to the current problem, Newton's method can be shown as:

$$\overline{D}_n^{k+1} = \overline{D}_n^k - \left[\frac{d\overline{E}_n^k}{d\overline{D}_n^k}\right]^{-1} \overline{E}_n^k. \qquad (6)$$

A discrete approximation to Newton's method as applied to the current problem can be shown as $$\overline{D}_n^{k+1} \approx \overline{D}_n^k + \left[\frac{\overline{D}_n^k - \overline{D}_n^{k-1}}{\overline{R}_n^k - \overline{R}_n^{k-1}}\right] \overline{E}_n^k, \qquad (7)$$

where $\Delta D_n^k = \overline{D}_n^k - \overline{D}_n^{k-1}$ represents the change in drive on previous iteration, and $$G_n^k = \left[\frac{\overline{D}_n^k - \overline{D}_n^{k-1}}{\overline{R}_n^k - \overline{R}_n^{k-1}}\right] \qquad (8)$$

represents the gain (weighting) on the $k^{th}$ iteration for $n^{th}$ harmonic. Note that $G_n^k$ in equation 7 takes the place of $\alpha_n$ (Alpha) in equation 5, and also that $G_n^k$ is a function of the previous changes in drive coefficients as well as previous changes in return coefficients. Accordingly, the weighting for each harmonic coefficient is adaptive in embodiments represented by FIG. 8, whereas the weighting for each harmonic coefficient is fixed in embodiments represented by FIG. 7. In some embodiments, both the fixed Alpha values and $G_n^k$ are used to compute new weighting coefficients at each iteration.

The following algorithm demonstrates use of the discrete approximation of Newton's method during each iteration:

--- for n=num_tune_harmonics
    //shift phase of each harmonic so that drive waveform is in phase with return $$R_n^k = R_n^k e^{i(\phi_D^{n=0,k} - \phi_R^{n=0,k})}$$

//compute error and magnitude of error $$E_n^k = T_n^k - R_n^k$$

$$|E_n^k| = \sqrt{E_n^k E_n^{k*}}$$

//compute magnitude of return and old delta D $$|R_n^k| = \sqrt{R_n^k R_n^{k*}}$$

$$|\Delta D_n^k| = \sqrt{\Delta D_n^k \Delta D_n^{k*}}$$

if error is less than one bit
        //error has converged, so set delta drive to zero and
        //set the new gain to the old gain $$\Delta D_n^{k+1} = 0$$

$$G_n^{k+1} = G_n^k$$

else if the old delta drive is zero and the error is large
        //use the stored gain to update the new drive $$\Delta D_n^{k+1} = G_n^k E_n^k$$

$$D_n^{k+1} = D_n^k + \Delta D_n^{k+1}$$

$$G_n^{k+1} = G_n^k$$

else if the old delta drive is not zero and the return is zero
        //increase the old drive by a factor of two and store the old gain coefficient $$\Delta D_n^{k+1} = 2 D_n^k$$

$$D_n^{k+1} = D_n^k + \Delta D_n^{k+1}$$

$$G_n^{k+1} = G_n^k$$

Else
        //no exceptions, so perform the Newton's iteration $$G_n^{k+1} = \frac{D_n^k - D_n^{k-1}}{R_n^k - R_n^{k-1}}$$

-continued $$\Delta D_n^{k+1} = G_n^{k+1} E_n^k$$
$$D_n^{k+1} = D_n^k + \Delta D_n^{k+1}$$

end for

Iterations may be performed on a periodic basis. For example, the algorithm above may be performed once per second or once per many seconds.

The functional blocks shown in FIGS. 7 and 8 may be implemented in any manner without departing from the scope of the present invention. For example, any combination of hardware and/or software may be utilized, as well as any level of integration. In some embodiments, a complete hardware solution is implemented. For example, one or more application specific integrated circuits (ASIC) or field programmable gate arrays (FPGA) may implement most or all of the blocks shown.

Figure 9:
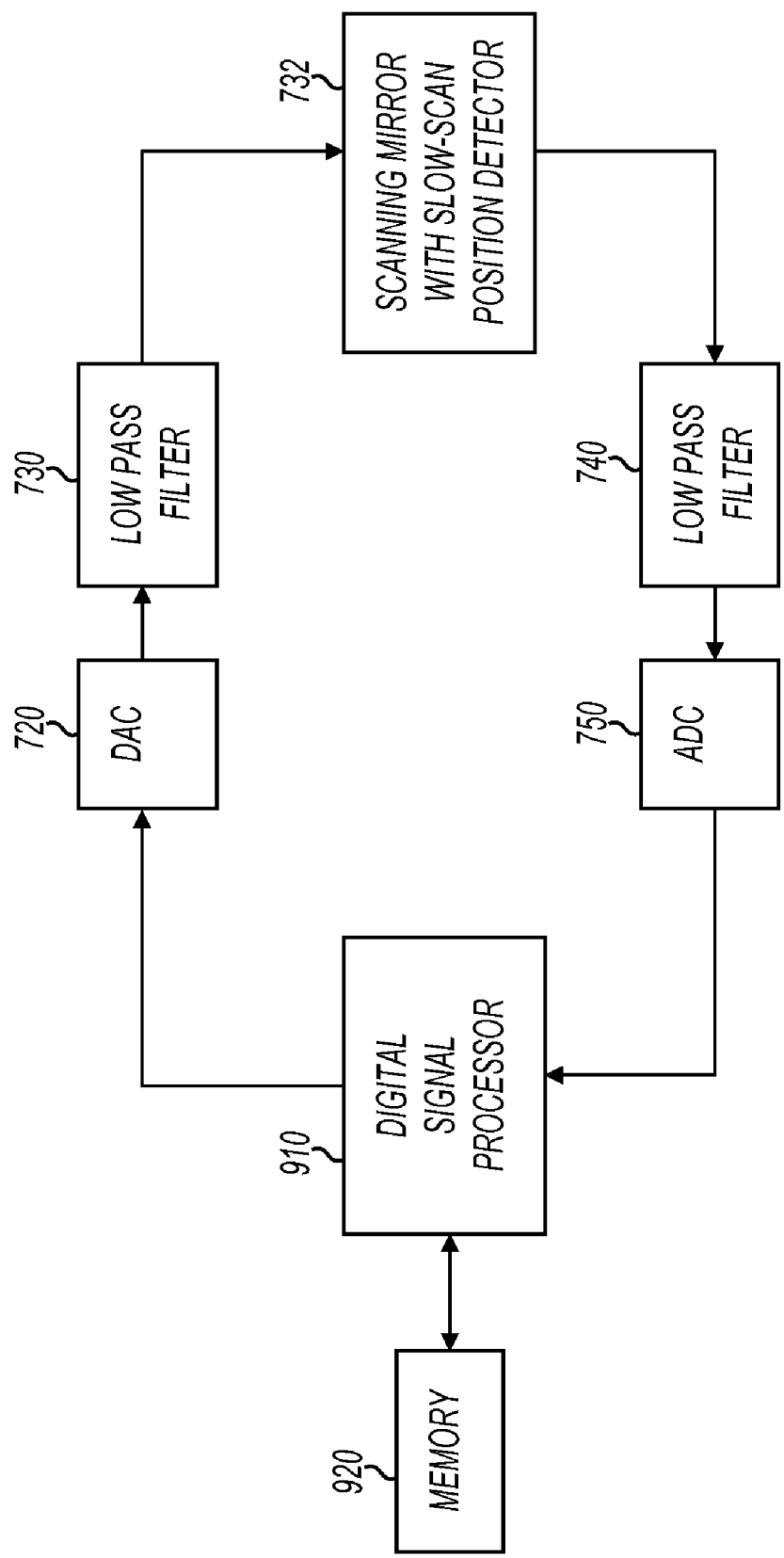
FIG. 9 shows a scanning mirror control loop that includes a digital signal processor.

In other embodiments, a processor executes instructions to perform the actions associated with FIGS. 7 and 8. For example, FIG. 9 shows a slow scan control loop that includes a digital signal processor (DSP). DSP 910 may be any type of processor capable of performing the actions described herein. For example, DSP 910 may be a commercially available processor or may be a custom processor. Further, DSP 910 may be a standalone integrated circuit or may be a "core" that is included in an ASIC.

DSP 910 receives digitized samples from ADC 750 and provides digital data for the ramp waveform to DAC 720. DSP 910 performs the iterative harmonic coefficient adjustments according to the embodiments shown in FIG. 7 or FIG. 8. Specifically, DSP 910 may use a fixed weighting array to provide different learning rates for each harmonic coefficient, or DSP 910 may use adaptive learning rates for each of the harmonic coefficients.

Memory 920 is a computer-readable medium upon which instructions are stored. For example, memory 920 may be a volatile memory such as static or dynamic random access memory (SRAM or DRAM) or may be non-volatile memory such as FLASH memory. In some embodiments, DSP 910 and memory 920 are included in a common integrated circuit such as an ASIC. Memory 920 may also be a medium suitable for distribution such as disk (hard, soft, compact, or otherwise) or server with downloadable files.

DSP 910 access instructions from memory 920 and performs various method embodiments of the present invention. For example, any of the iterative harmonic coefficient determination embodiments may be performed by DSP 910. In addition, DSP 910 may characterize the response of scanning mirror 732 as described above with reference to the Mirror-Gain array.

Figure 10:
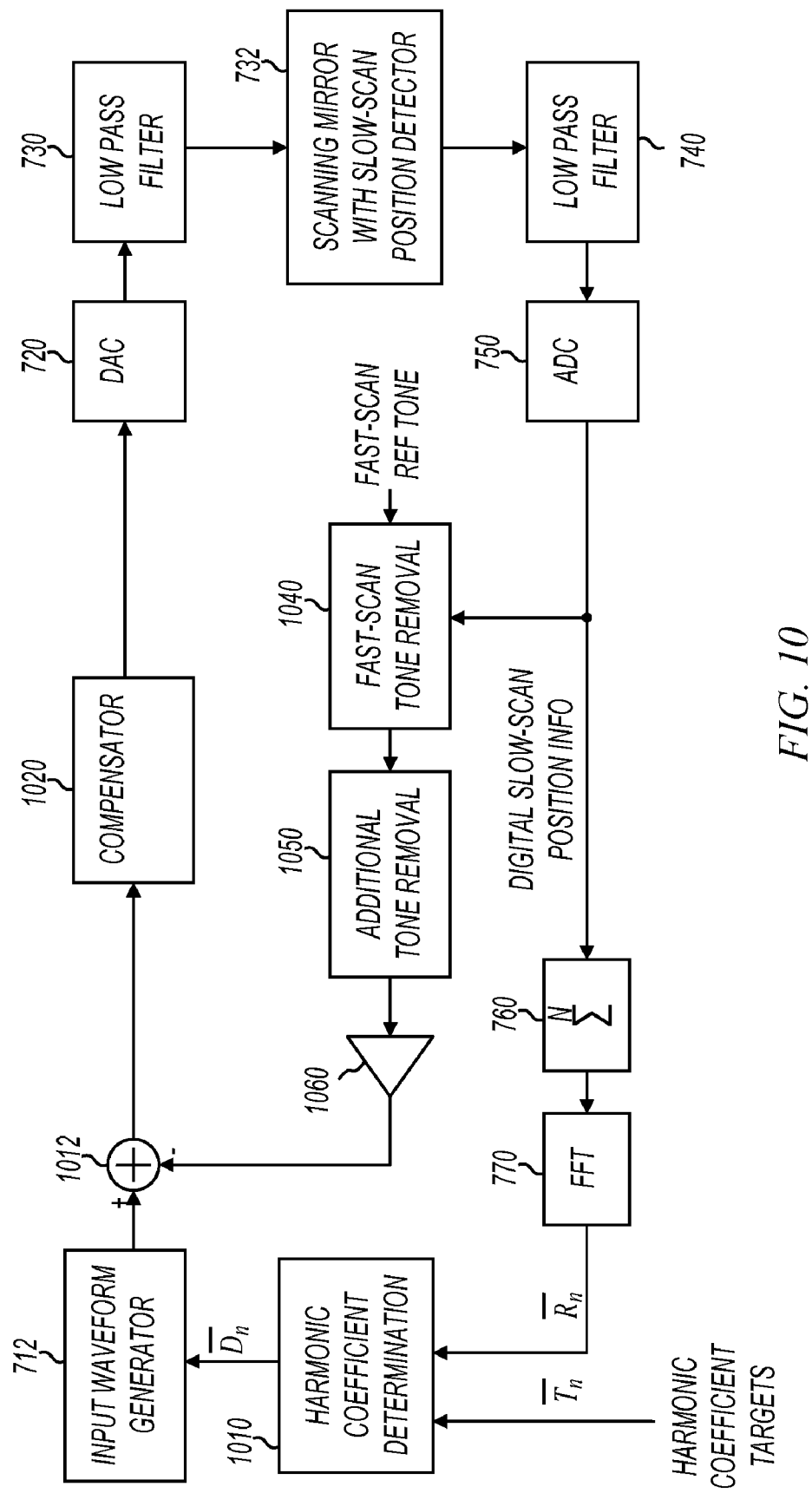
FIGS. 10 and 11 show scanning mirror slow-scan control systems that include two loops.

FIG. 10 shows a scanning mirror slow-scan control system that includes two loops. The system of FIG. 10 includes a low gain "inner loop" to modify the transfer function of the scanning mirror as seen by the "outer loop". The inner loop operates in the time domain and updates substantially in real time, whereas the outer loop operates in the frequency domain and updates more slowly.

The inner loop is formed by summer 1012, compensator 1020, DAC 720, low pass filters 730 and 740, scanning mirror 732, ADC 750, fast-scan tone removal block 1040, additional tone removal block 1050, and gain stage 1060. Compensator 1020 is included to compensate for scanning mirror transfer function gain and phase characteristics, and therefore modify the transfer function of the scanning mirror as seen by the outer loop. Compensator 1020 may take any form, including an analog or digital filter of arbitrary order. Example compensators are described further below. The inner loop can include any type of compensation circuit without departing from the scope of the present invention. The type and order of compensation circuits may be determined based at least in part on the transfer function of the scanning mirror. In some embodiments, compensator 1020 is implemented as an analog circuit, and DAC 720 precedes compensator 1020 in the signal path.

The outer loop is formed by input waveform generator 712, summer 1012, compensator 1020, DAC 720, low pass filters 730 and 740, scanning mirror 732, ADC 750, summing buffer 760, FFT 770, and harmonic coefficient determination block 1010.

Harmonic coefficient determination block may be either coefficient determination block 710 (FIG. 7) or 810 (FIG. 8). For example, in some embodiments, harmonic coefficient determination block 1010 may utilize a weighting array to determine learning rates of each harmonic coefficient, and in other embodiments, coefficient determination block 1010 may adaptively determine learning rates using an approximation to Newton's method.

Figure 11:
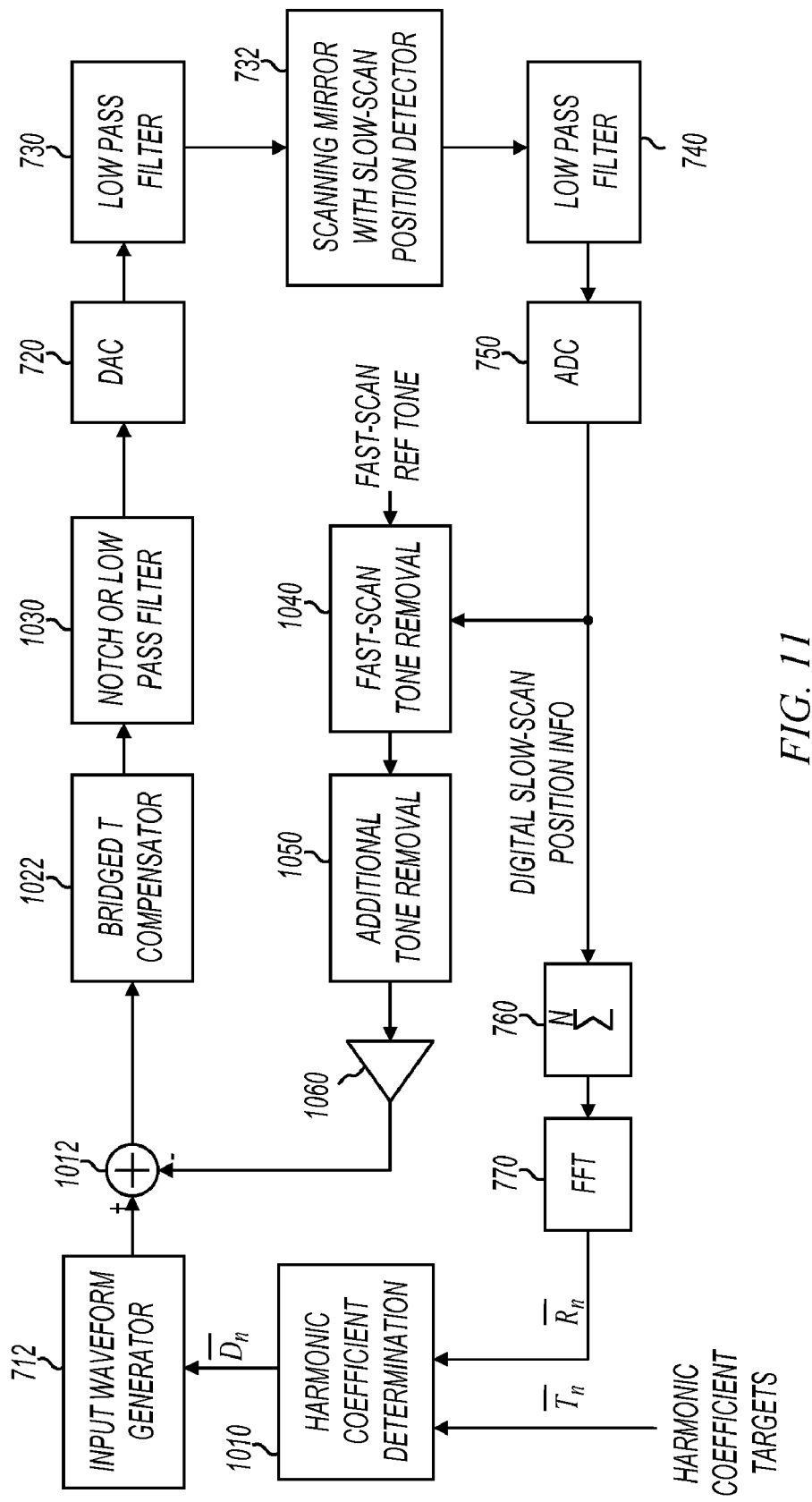

FIG. 11 shows a scanning mirror slow-scan control system that includes two loops. The control system of FIG. 11 shows a bridged-T compensator 1022 and filter 1030 in the place of compensator 1020 of FIG. 10. Bridged-T compensators are useful for eliminating instabilities in motion control systems caused by torsional resonance. See Gregory J. Schneider, *Taming Resonance in Servos*, Machine Design, (Feb. 7, 1985).

In various embodiments of the present invention, bridged-T compensator 1022 compensates for in-band mirror resonances that interfere with the slow-scan drive. For example, referring back to FIG. 6, the scanning mirror linear response shows a resonance at 795 Hz, which is within the frequency range of the harmonic drive signals. Bridged-T compensator 1022 is tuned to compensate for this in-band resonance, thereby reducing the gain variation that is handled by harmonic coefficient block 1010. Bridged-T compensator 1022 may be implemented as a finite impulse response (FIR) digital filter.

Figure 12:
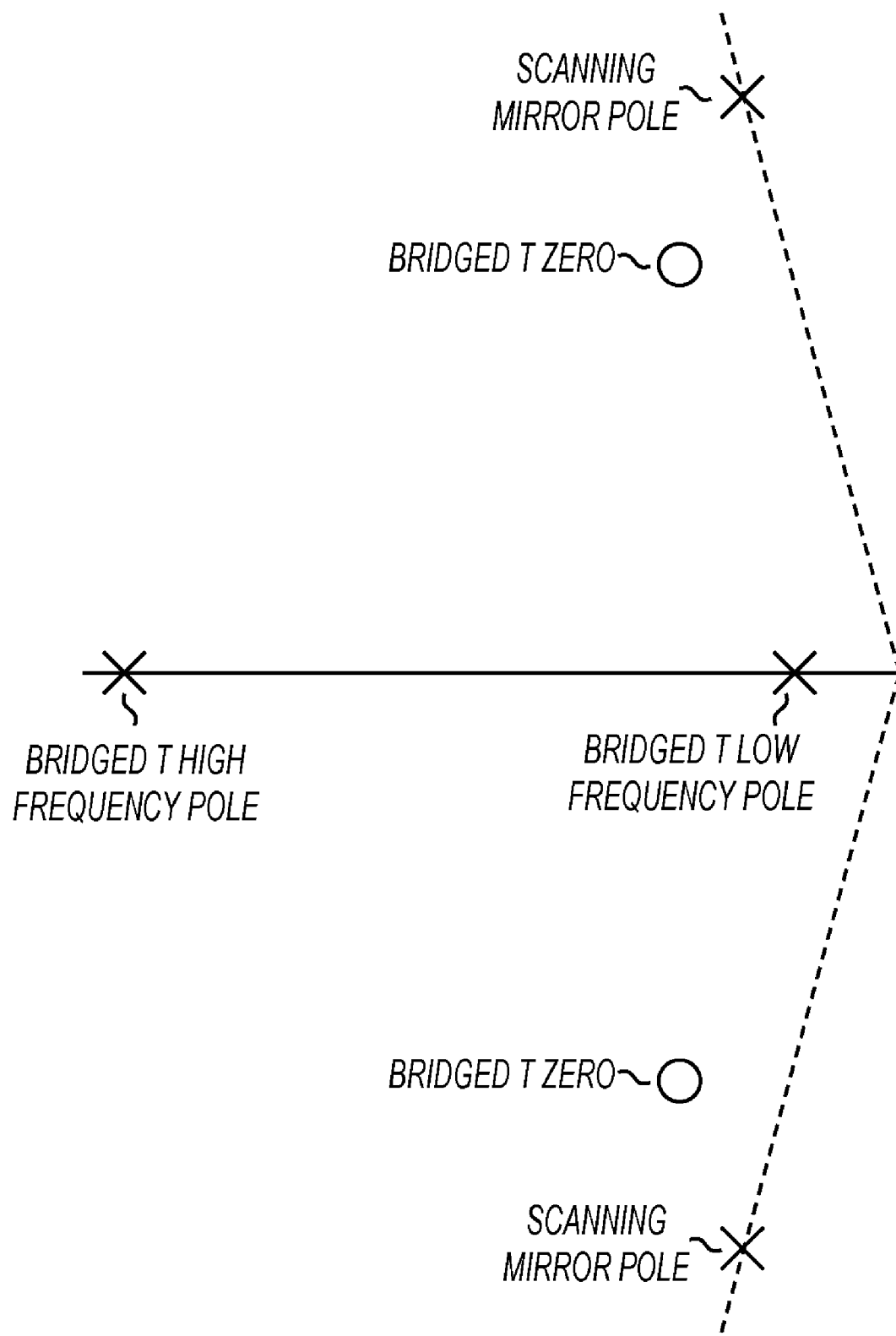
FIG. 12 shows a root locus plot showing the operation of a bridged-T compensator.

FIG. 12 shows a root locus plot showing the operation of bridged-T compensator 1022. The two scanning mirror poles cause the resonance shown at 795 Hz in FIG. 6. The bridged-T compensator provides two poles on the real axis, and two zeros to cancel the two scanning mirror poles. In some embodiments, the bridged-T zeros are superimposed directly on the scanning mirror poles, and in some embodiments, the bridged-T zeros are at the same angular offset as the scanning mirror poles. By placing the bridged-T zeros as shown in FIG. 12, phase margin is increased. The zeros are placed on a lower angle from the real axis as the mirror poles and at a smaller radius, resulting in both a lower Q and frequency for the zeros than for the mirror poles.

Referring now back to FIG. 11, a filter 1030 follows the bridged-T compensator in the signal path. Filter 1030 may be a notch filter or low pass filter that is tuned to remove spectral energy at a frequency of a resonant mode outside the frequency band occupied by the harmonic drive coefficients. For example, in some embodiments, filter 1030 may be a notch filter tuned to 6.5 kHz to filter out the 6.5 kHz ancillary vibration mode (FIG. 6). In other embodiments, filter 1030 may be a low pass filter having a cutoff frequency suitable to remove the unwanted spectral energy. Various scanning mirror designs may exhibit ancillary resonance at frequencies other than 6.5 kHz, and filter 1030 may also be tuned to remove spectral energy at these other frequencies.

Figure 13:
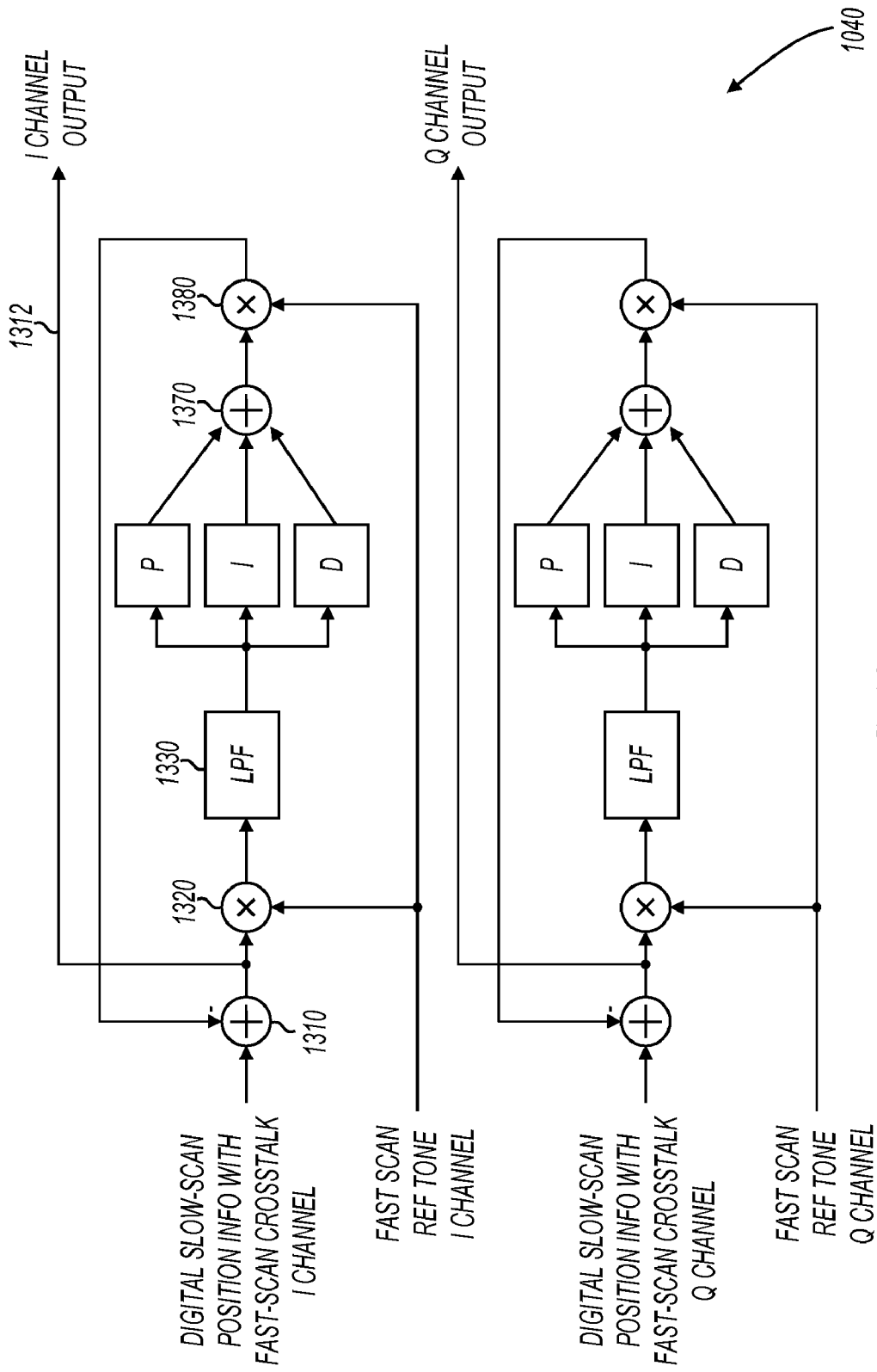
FIG. 13 shows a fast-scan tone removal block.

The inner loop also includes fast-scan tone removal block 1040. Fast-scan removal block 1040 removes spectral energy at the fast-scan frequency that results from unintentional electrical and/or mechanical crosstalk in the scanning mirror. Fast-scan tone removal block 1040 receives a copy of the fast-scan tone used to excite the scanning mirror on the fast scan axis. An example fast-scan tone removal block is shown in FIG. 13. FIG. 13 shows a least mean square (LMS) tone canceller that includes in-phase and quadrature circuits to operate on complex signal samples. The in-phase circuit includes summers 1310 and 1370, multipliers 1320 and 1380, low pass filter (LPF) 1330, and a proportional/integral/derivative (PID) controller that includes a proportional block (P), an integrator block (I), and a derivative block (D).

In operation, the output of multiplier 1380 regenerates the I-channel of the fast-scan crosstalk present on the input signal. The regenerated I-channel is subtracted from the input signal to produce the I-channel output at 1312. The I-channel output is mixed with the I-channel fast-scan reference tone by multiplier 1320, and the result is low pass filtered by LPF 1330. The DC output of LPF 1330 is the error term that represents the spectral content at the fast-scan frequency. The PID controller operates to drive this error to zero. The output of the PID blocks are summed at 1370, and the result is mixed back up to the fast-scan frequency by mixer 1380 to regenerate the I-channel of the fast-scan crosstalk present on the input signal. The Q channel circuit operates in the same fashion as the I-channel just described.

In some embodiments, fast-scan tone removal block 1040 does not utilize the proportional block (P) or the derivative block (D). In these embodiments, the integrator block (I) integrates the error term to arrive at the output that recreates the fast-scan tone spectral content.

Referring now back to FIG. 10, additional tone removal block 1050 may also perform tone removal for other tones. For example, tones resulting from the 1.9 kHz resonance (FIG. 6) may be removed by additional tone removal block 1050. In some embodiments, one or both of tone removal blocks 1040 and 1050 may include a notch filter or an LMS tone canceller. The LMS tone canceller imparts no phase delay and therefore preserves phase margin in the loop. Gain block 1060 provides gain to the inner feedback loop prior to combining the inner and outer loop data streams at 1012.

Figure 14:
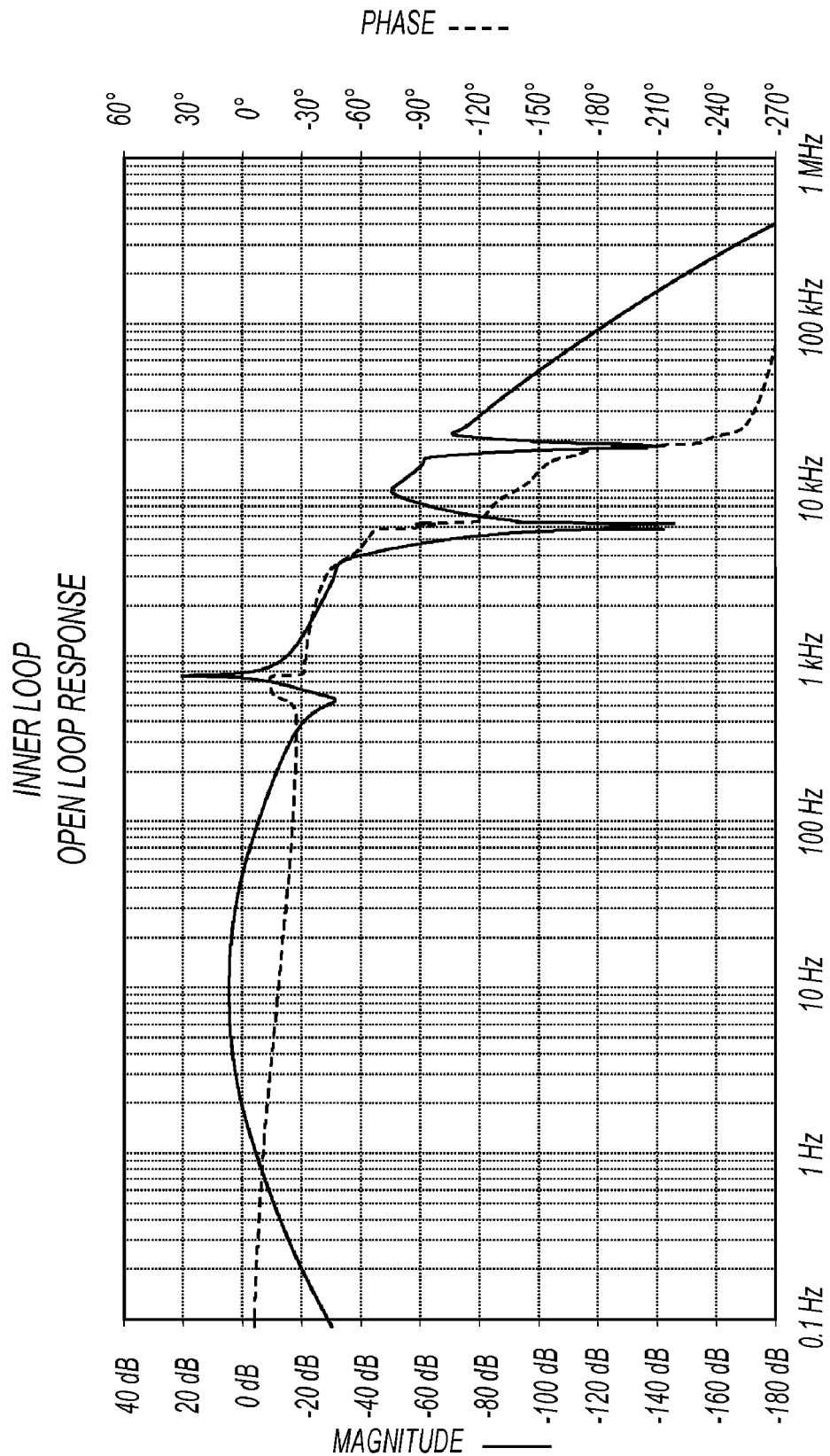
FIG. 14 shows the open loop response of the inner feedback loop of FIG. 11.
Figure 15:
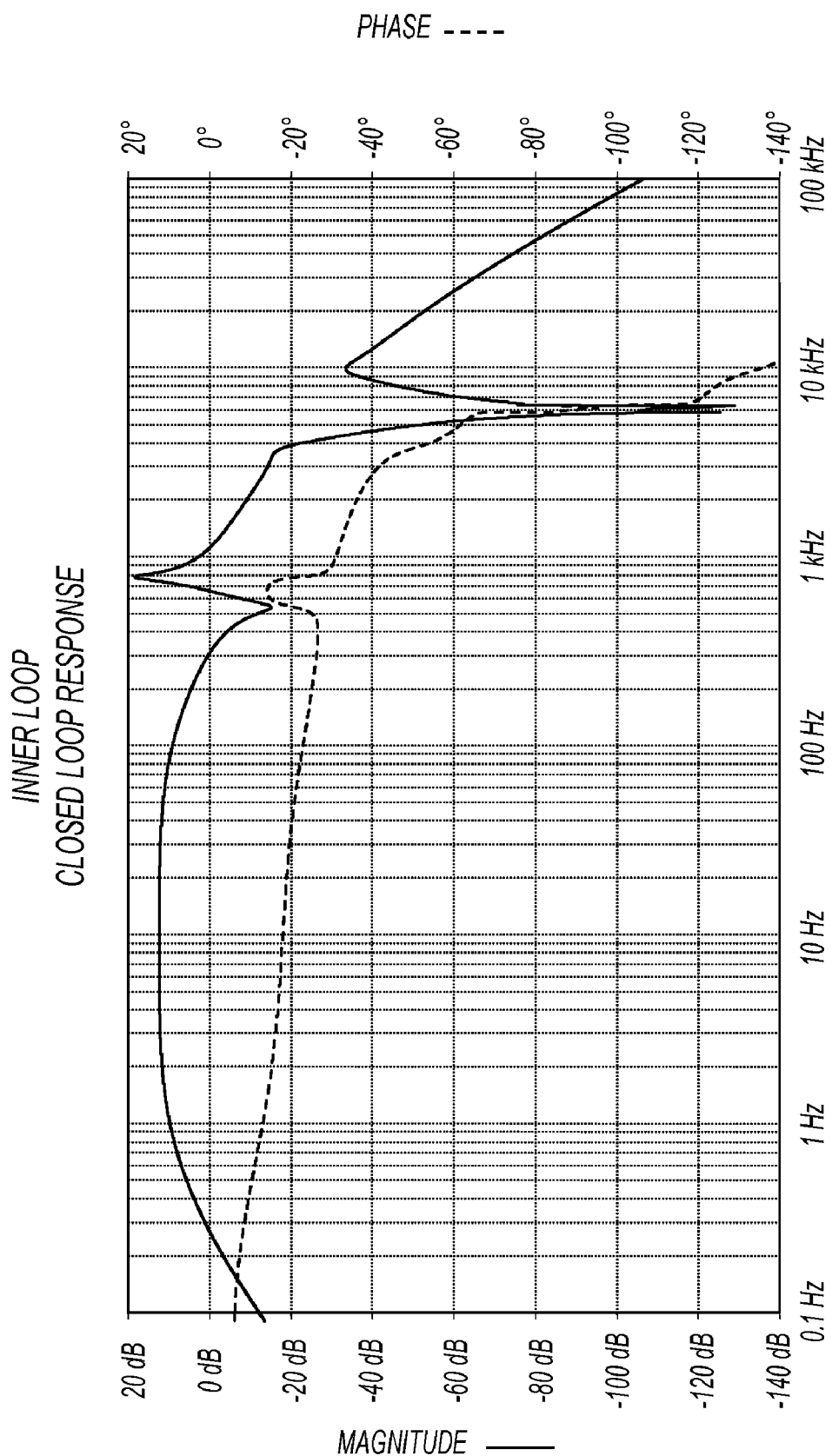
FIG. 15 shows the closed loop response of the inner feedback loop of FIG. 11.

FIGS. 14 and 15 show the open loop response and the closed loop response for the inner loop of FIG. 11. As shown in the figures, the bridged-T compensator modifies the closed loop response, thereby improving loop stability. This improvement in loop stability (i.e. phase margin) is what prevents the unwanted frequency components of the slow-scan from presenting themselves on the slow-scan drive signal. This phase improvement occurs because it eliminates the abrupt 180 degree phase transition of the imaginary scanning mirror poles at the slow-scan frequency and introduces the slowly varying phase response of the two real poles spread over a wider frequency range.

Figure 16:
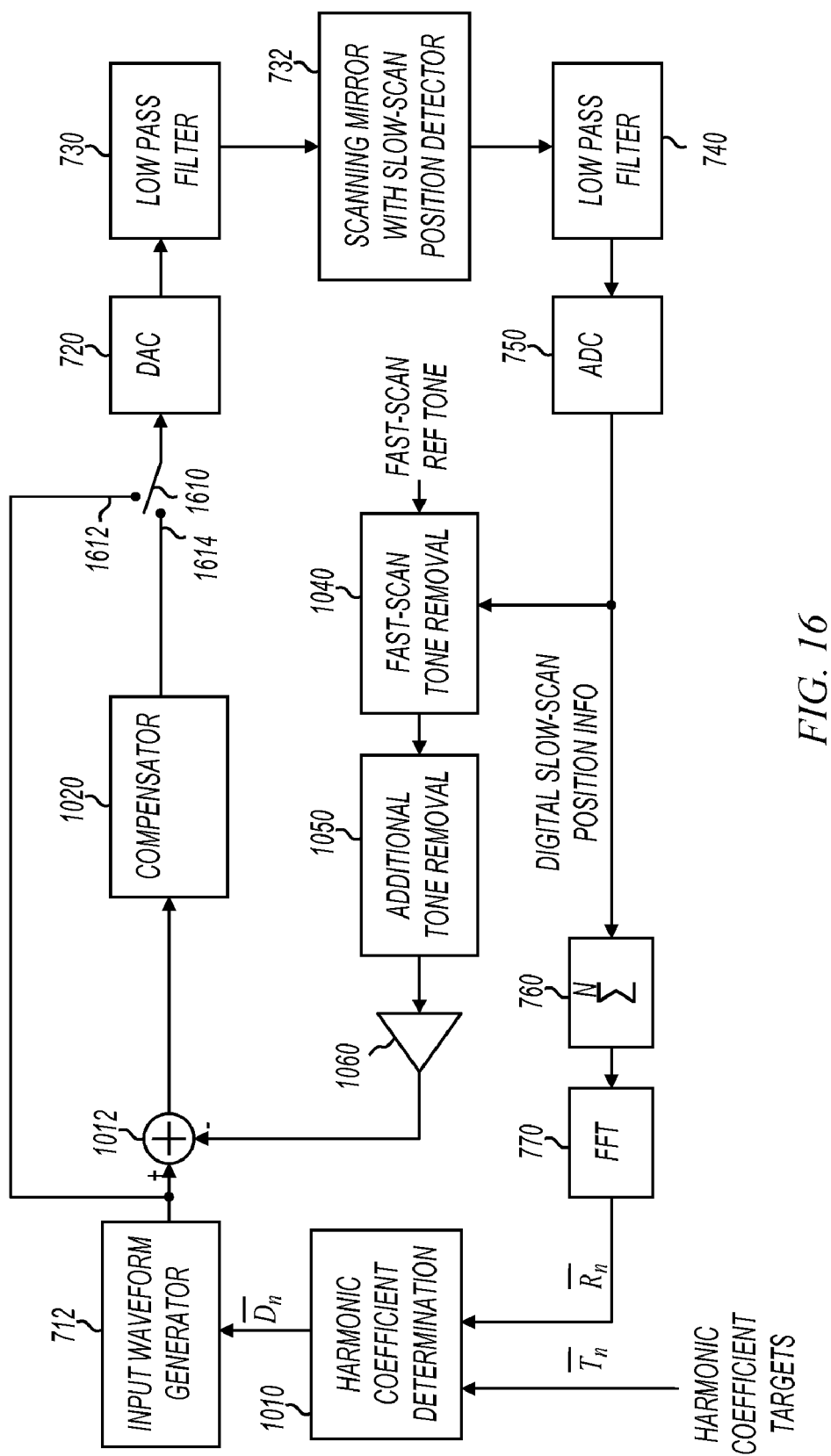
FIG. 16 shows a combination single/dual loop slow-scan control system.

FIG. 16 shows a combination single/dual loop slow-scan control system. The system shown in FIG. 16 includes everything shown in FIG. 10, and also includes a switch 1610. When switch 1610 is in position 1614, the system of FIG. 16 operates with two loops in the same manner as the system in FIG. 10. When switch 1610 is in position 1612, the inner loop is bypassed, and then the system of FIG. 16 operates with a single loop similar to those shown in FIGS. 7 and 8.

In some embodiments, the system of FIG. 16 may operate with one loop to characterize the scanning mirror, then operate with two loops while controlling movement of the scanning mirror. The system of FIG. 16 may also switch back and forth between the outer loop and two loops based on operating conditions.

Figure 17:
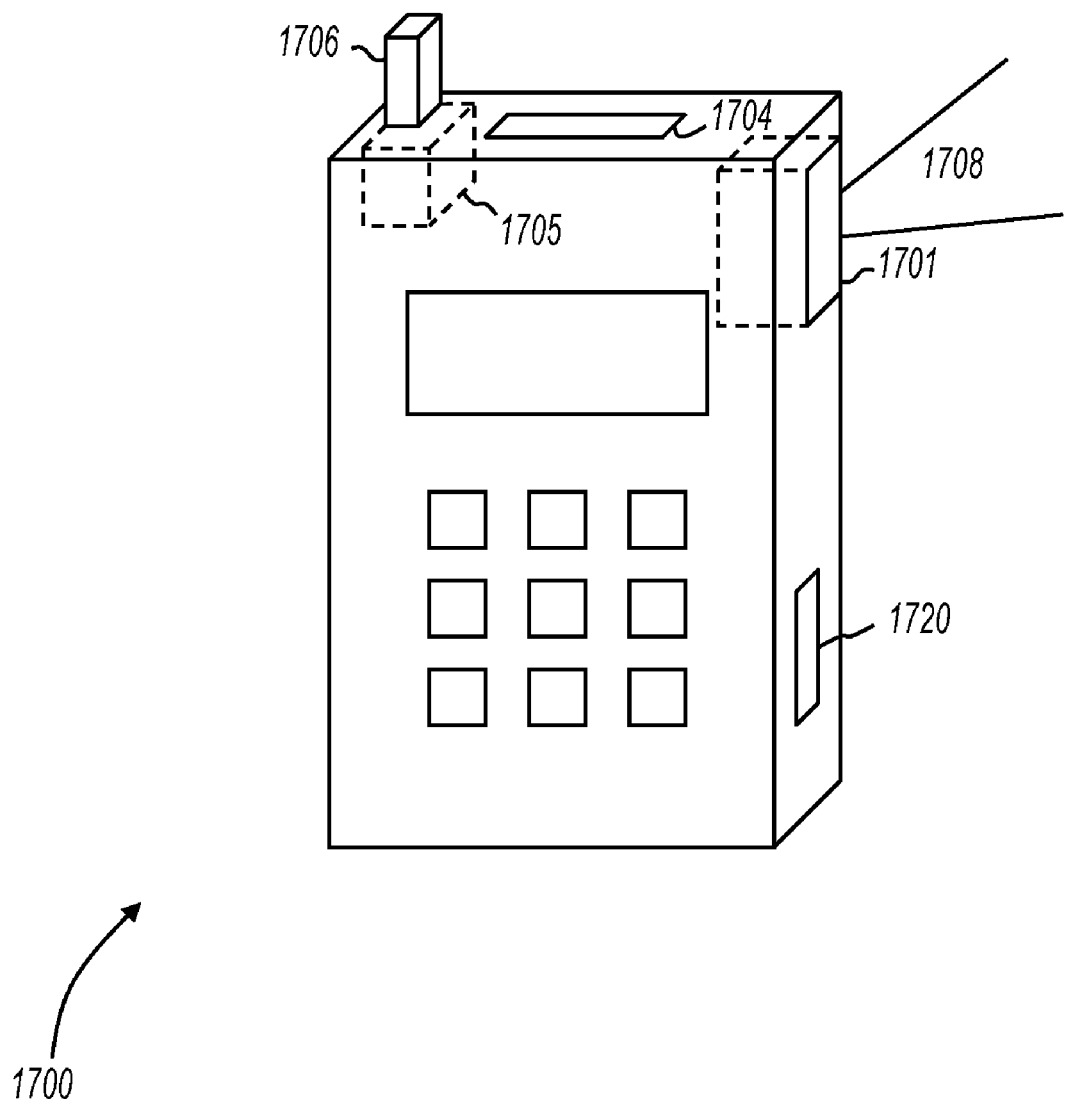
FIG. 17 shows a mobile device in accordance with various embodiments of the present invention.

FIG. 17 shows a mobile device in accordance with various embodiments of the present invention. Mobile device 1700 may be a hand held projection device with or without communications ability. For example, in some embodiments, mobile device 1700 may be a handheld projector with little or no other capabilities. Also for example, in some embodiments, mobile device 1700 may be a device usable for communications, including for example, a cellular phone, a smart phone, a personal digital assistant (PDA), a global positioning system (GPS) receiver, or the like. Further, mobile device 1700 may be connected to a larger network via a wireless (e.g., WiMax) or cellular connection, or this device can accept data messages or video content via an unregulated spectrum (e.g., WiFi) connection.

Mobile device 1700 includes scanning projection device 1701 to create an image with light 1708. Similar to other embodiments of projection systems described above, mobile device 1700 includes a projector with a scanning mirror and a slow-scan control system.

In some embodiments, mobile device 1700 includes antenna 1706 and electronic component 1705. In some embodiments, electronic component 1705 includes a receiver, and in other embodiments, electronic component 1705 includes a transceiver. For example, in GPS embodiments, electronic component 1705 may be a GPS receiver. In these embodiments, the image displayed by scanning projection device 1701 may be related to the position of the mobile device. Also for example, electronic component 1705 may be a transceiver suitable for two-way communications. In these embodiments, mobile device 1700 may be a cellular telephone, a two-way radio, a network interface card (NIC), or the like.

Mobile device 1700 also includes memory card slot 1704. In some embodiments, a memory card inserted in memory card slot 1704 may provide a source for video data to be displayed by scanning projection device 1701. Memory card slot 1704 may receive any type of solid state memory device, including for example, Multimedia Memory Cards (MMCs), Memory Stick DUOs, secure digital (SD) memory cards, and Smart Media cards. The foregoing list is meant to be exemplary, and not exhaustive.

Mobile device 1700 also includes data connector 1720. In some embodiments, data connector 1720 can be connected to one or more cables to receive analog or digital video data for projection by scanning projection device 1701. In other embodiments, data connector 1720 may mate directly with a connector on a device that sources video data.

Figure 18:
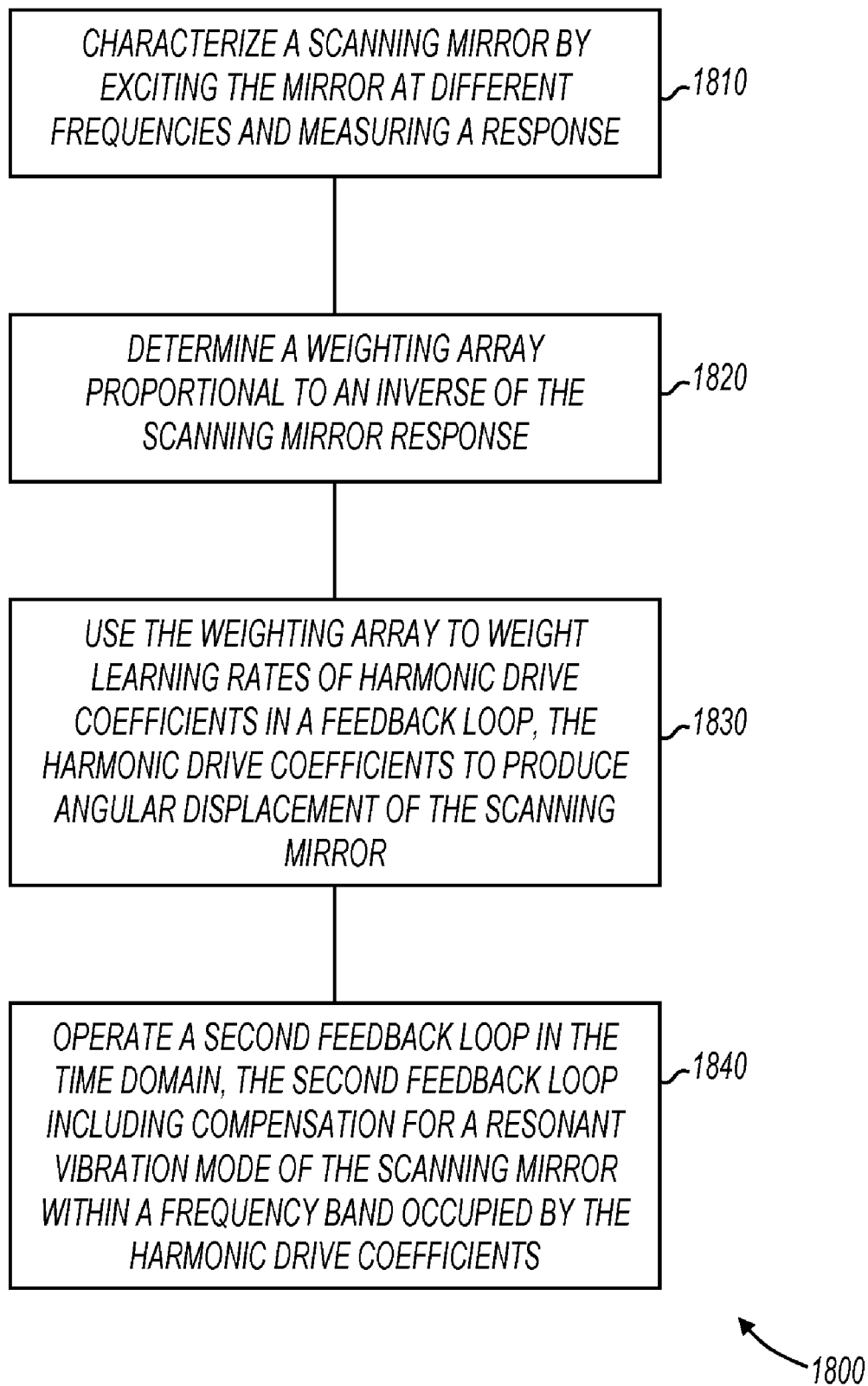
FIGS. 18 and 19 show flowcharts of methods in accordance with various embodiments of the present invention.

FIG. 18 shows a flowchart in accordance with various embodiments of the present invention. In some embodiments, method 1800, or portions thereof, is performed by a scanned beam projection system, embodiments of which are shown in previous figures. In other embodiments, all or portions of method 1800 are performed by a hardware/software combination in an electronic system. Method 1800 is not limited by the particular type of apparatus performing the method. The various actions in method 1800 may be performed in the order presented, or may be performed in a different order. Further, in some embodiments, some actions listed in FIG. 18 are omitted from method 1800.

Method 1800 is shown beginning with block 1810 in which a scanning mirror is characterized by exciting the mirror at different frequencies and measuring a response. The measured response may be over any range of frequencies. For example, in some embodiments, the response may be measured over the frequency range encompassed by the slow-scan drive coefficients. Also for example, in some embodiments, the excitation may span a large frequency range expected to discover resonant vibration modes up to and including the fast-scan resonant vibration mode. The result will be a response similar to that shown in FIG. 6.

At 1820, a weighting array proportional to an inverse of the scanning mirror response is determined. This corresponds to the calculation of the MirrorGain array described above. At 1830, the weighting array is used to weight learning rates of harmonic drive coefficients in a feedback loop. The harmonic drive coefficients are used to produce angular displacement of the scanning mirror in the slow-scan direction. This corresponds to the operation of iterative harmonic drive coefficient determination block 710 (FIG. 7).

At 1840, a second feedback loop is operated in the time domain, the second feedback loop including compensation for a resonant vibration mode of the scanning mirror within a frequency band occupied by the harmonic drive coefficients. For example, bridged-T compensator 1022 (FIG. 11) compensates for the resonant vibration mode found at 795 Hz. The second feedback loop may also include additional filtering for other ancillary resonant vibration modes, as well as LMS adaptive tone cancelling to remove unwanted tones (e.g., fast-scan frequency tones).

Figure 19:
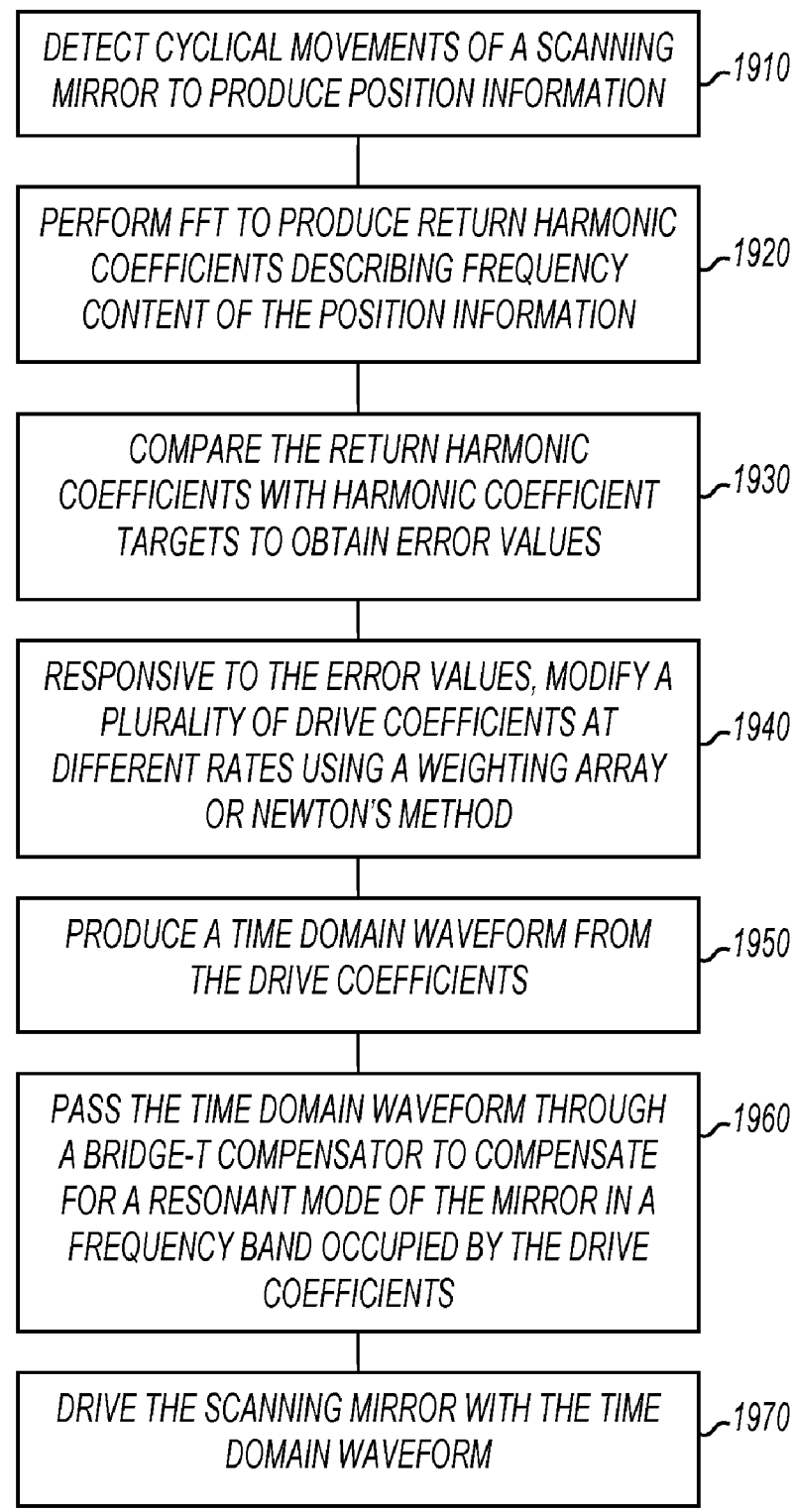

FIG. 19 shows a flowchart in accordance with various embodiments of the present invention. In some embodiments, method 1900, or portions thereof, is performed by a scanned beam projection system, embodiments of which are shown in previous figures. In other embodiments, all or portions of method 1900 are performed by a hardware/software combination in an electronic system. Method 1900 is not limited by the particular type of apparatus performing the method. The various actions in method 1900 may be performed in the order presented, or may be performed in a different order. Further, in some embodiments, some actions listed in FIG. 19 are omitted from method 1900.

Method 1900 is shown beginning with block 1910 in which cyclical movements of a scanning mirror are detected to produce position information. In some embodiments, this corresponds to a piezoresistive position sensor detecting an angular displacement of a MEMS scanning mirror. At 1920, an FFT is performed to produce return harmonic coefficients describing frequency content of the position information. In some embodiments, multiple frames of position information are averaged prior to performing the FFT.

At 1930, the return harmonic coefficients are compared with harmonic coefficient targets to obtain error values. This corresponds to comparing $\overline{R}_n$ and $\overline{T}_n$ as described above with reference to previous figures. At 1940, a plurality of drive coefficients are modified responsive to the error values. Each of the plurality of drive coefficients is modified at a different rate. For example, a weighting array proportional to an inverse of a mirror response may be used to set learning rates.

Also for example, a discrete approximation of Newton's method may be used to adaptively modify learning rates of the drive coefficients.

At 1950, a time domain waveform is produced from the drive coefficients. This may be performed by creating time domain waveforms for each drive coefficient and summing them, or by performing an inverse FFT, or the like. At 1960, the time domain waveform is passed through a bridge-T compensator to compensate for a resonant mode of the mirror in a frequency band occupied by the drive coefficients, and at 1970, the scanning mirror is driven with the time domain waveform.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method comprising:
    detecting cyclical movement of a scanning mirror to produce position information;
    performing a Fourier transform to produce return harmonic coefficients describing frequency content of the position information;
    comparing the return harmonic coefficients with harmonic coefficient targets to obtain error values; and
    responsive to the error values, modifying a plurality of drive coefficients at different rates.

2. The method of claim 1 wherein the different rates are specified as static values.

3. The method of claim 2 wherein the different rates are inversely related to a scanning mirror transfer function.

4. The method of claim 1 wherein the different rates are adaptively determined.

5. The method of claim 1 wherein modifying a plurality of drive coefficients at different rates comprises applying a discrete approximation of Newton's method.

6. The method of claim 1 further comprising:
    producing a time domain waveform from the drive coefficients; and
    passing the time domain waveform through a compensation circuit to substantially compensate for a resonant mode of the scanning mirror in a frequency band occupied by the drive coefficients.

7. The method of claim 6 further comprising passing the time domain waveform through a filter to remove spectral energy at a resonant frequency outside the frequency band occupied by the drive coefficients.

8. The method of claim 7 further comprising:
    converting the time domain waveform to an analog drive signal; and
    driving the scanning mirror with the analog signal.

9. A method comprising:
    characterizing a scanning mirror by exciting the scanning mirror at different frequencies and measuring a response;
    determining a weighting array proportional to an inverse of the scanning mirror response; and
    using the weighting array to weight learning rates of harmonic drive coefficients in a feedback loop, the harmonic drive coefficients to produce angular displacement of the scanning mirror.

10. The method of claim 9 further comprising operating a second feedback loop in the time domain, the second feedback loop including compensation for a resonant vibration mode of the scanning mirror within a frequency band occupied by the harmonic drive coefficients.

11. A computer-readable medium having instructions stored thereon that when accessed result in a computer performing:
   receiving time domain data describing angular movement of a scanning mirror in a slow-scan direction;
   performing a fast Fourier transform on the time domain data to produce return harmonic coefficients;
   comparing the return harmonic coefficients with harmonic coefficient targets to determine errors;
   modifying a plurality of drive coefficients by differing amounts to reduce the errors; and
   performing an inverse fast Fourier transform on the drive coefficients to produce a drive waveform to drive the scanning mirror in the slow-scan direction.

12. The computer-readable medium of claim 11 wherein modifying the plurality of drive coefficients by differing amounts comprises applying weights that are inversely related to a frequency response of the scanning mirror.

13. The computer-readable medium of claim 11 wherein modifying the plurality of drive coefficients by differing amounts comprises adaptively determining weights to apply to each of the plurality of drive coefficients.

14. The computer-readable medium of claim 13 wherein adaptively determining weights comprises applying a discrete approximation of Newton's method.

15. An apparatus comprising:
   a scanning mirror having a fast-scan axis and a slow-scan axis, the slow-scan axis having a position detector;
   an outer control loop that operates in the frequency domain to determine harmonic coefficients of a drive signal in response to position information received from the position detector; and
   an inner control loop that operates in the time domain to compensate for a scanning mirror resonant vibration mode at a frequency within a frequency band occupied by the harmonic coefficients of the drive signal.

16. The apparatus of claim 15 wherein the inner loop includes a bridged-T compensator to compensate for the scanning mirror resonant vibration mode.

17. The apparatus of claim 15 wherein the inner loop includes filtering to remove spectral energy at one or more resonant frequencies that are outside the frequency band occupied by the harmonic coefficients of the drive signal.

18. The apparatus of claim 17 wherein the inner loop further comprises a least mean square (LMS) tone cancelling circuit to remove spectral energy corresponding to scanning mirror movement on the fast-scan axis.

19. The apparatus of claim 15 wherein the outer loop includes an iterative harmonic determination block to modify the drive coefficients by unequal amounts at each iteration.

20. The apparatus of claim 19 wherein each of the drive coefficients is modified by an amount proportional to an inverse of a scanning mirror frequency response.

21. The apparatus of claim 19 wherein the iterative harmonic determination block utilizes a discrete approximation of Newton's method to modify each of the drive coefficients.

22. A mobile device comprising:
   a communications transceiver;
   a scanning mirror; and
   a slow-scan scanning mirror control system having an outer loop operating in the frequency domain and an inner loop operating in the time domain.

23. The mobile device of claim 22 wherein the outer loop determines scanning mirror harmonic drive coefficients using a discrete approximation to Newton's method.

24. The mobile device of claim 22 wherein the inner loop includes compensation circuitry to compensate for a scanning mirror resonant vibration mode within a frequency band used to drive a slow-scan axis of the scanning mirror.

25. The mobile device of claim 22 wherein the inner loop includes a least mean square (LMS) tone cancelling circuit to remove spectral energy at a fast-scan frequency.

* * * * *